US008112513B2

(12) United States Patent
Margulis

(10) Patent No.: US 8,112,513 B2
(45) Date of Patent: *Feb. 7, 2012

(54) MULTI-USER DISPLAY PROXY SERVER

(75) Inventor: Neal D. Margulis, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 819 days.

This patent is subject to a terminal disclaimer.

(21) Appl. No.: 11/289,983

(22) Filed: Nov. 30, 2005

(65) Prior Publication Data
US 2007/0124474 A1 May 31, 2007

(51) Int. Cl.
G06F 15/173 (2006.01)
(52) U.S. Cl. ....................................................... 709/224
(58) Field of Classification Search ........... 711/E12.025, 711/E12.031, E12.026, 152, E12.032; 709/224, 709/226, 214; 714/E11.072; 713/1, 2, 100, 713/310, 300; 726/23; 710/1
See application file for complete search history.

(56) References Cited

U.S. PATENT DOCUMENTS

| 5,325,377 | A | * | 6/1994 | Tuttle | 714/819 |
|---|---|---|---|---|---|
| 5,455,911 | A | * | 10/1995 | Johansson | 710/44 |
| 5,602,589 | A | | 2/1997 | Vishwanath | |
| 5,642,156 | A | * | 6/1997 | Saiki | 348/14.09 |
| 5,708,961 | A | | 1/1998 | Hylton | |
| 5,850,482 | A | | 12/1998 | Meaney | |
| 5,852,437 | A | | 12/1998 | Wugofski | |
| 5,862,150 | A | * | 1/1999 | Lavelle et al. | 714/732 |
| 5,909,518 | A | | 6/1999 | Chui | |
| 5,911,582 | A | | 6/1999 | Redford | |
| 5,977,933 | A | | 11/1999 | Wicher | |
| 6,008,847 | A | * | 12/1999 | Bauchspies | 375/240.01 |
| 6,031,940 | A | | 2/2000 | Chui | |
| 6,075,906 | A | | 6/2000 | Fenwick | |
| 6,097,441 | A | | 8/2000 | Allport | |
| 6,104,334 | A | | 8/2000 | Allport | |

(Continued)

FOREIGN PATENT DOCUMENTS

EP 1562173 A2 * 8/2005

OTHER PUBLICATIONS

Millman, S. E., "LP-5: Late-News Poster: Update to VESA Digital Packet Video Link (DPVL) Proposed Standard," SID 04 Digest, 2004, pp. 412-415, ISSN/0004-0966X/04/3501-0412.

(Continued)

Primary Examiner — Jeffrey Pwu
Assistant Examiner — Saad A Waqas
(74) Attorney, Agent, or Firm — Woodcock Washburn LLP

(57) ABSTRACT

A multi-user host computer system comprises processor blades combined with terminal services blades to provide acceleration and proxy server functions for supporting a variety of remote terminals. For each remote terminal, the terminal services blade and proxy server functions may improve the video and graphics performance. This allows the multi-user host computer system to more efficiently support multiple users. The terminal services blade may include a graphics processor that manages a virtual display for each remote terminal and provides selective updates of sub frame data. Where appropriate, the sub frame data is encoded and transmitted over the network to the remote terminals. The terminal services processor also offloads and optimizes video data streams for the intended remote terminals and their respective network connections. Processor blades may include a base-board management controller that utilizes advanced features for supporting remote KVM administration.

16 Claims, 10 Drawing Sheets

U.S. PATENT DOCUMENTS

| | | | | |
|---|---|---|---|---|
| 6,108,104 | A * | 8/2000 | Tesavis | 358/434 |
| 6,141,059 | A | 10/2000 | Boyce | |
| 6,141,447 | A | 10/2000 | Linzer | |
| 6,199,160 | B1 * | 3/2001 | Echensperger et al. | 713/100 |
| 6,222,885 | B1 | 4/2001 | Chaddha | |
| 6,256,019 | B1 | 7/2001 | Allport | |
| 6,263,503 | B1 | 7/2001 | Margulis | |
| 6,323,854 | B1 * | 11/2001 | Knox et al. | 345/418 |
| 6,340,994 | B1 | 1/2002 | Margulis | |
| 6,409,602 | B1 | 6/2002 | Wiltshire | |
| 6,437,803 | B1 | 8/2002 | Panasyuk | |
| 6,456,340 | B1 | 9/2002 | Margulis | |
| 6,510,177 | B1 | 1/2003 | De Bonet | |
| 6,600,838 | B2 | 7/2003 | Chui | |
| 6,611,530 | B1 | 8/2003 | Apostolopoulos | |
| 6,628,716 | B1 | 9/2003 | Tan | |
| 6,658,019 | B1 | 12/2003 | Chen | |
| 6,664,969 | B1 * | 12/2003 | Emerson et al. | 345/544 |
| 6,701,380 | B2 | 3/2004 | Schneider | |
| 6,704,024 | B2 | 3/2004 | Robotham et al. | 345/581 |
| 6,721,837 | B2 | 4/2004 | MacInnis | |
| 6,754,266 | B2 | 6/2004 | Bahl | |
| 6,757,851 | B1 | 6/2004 | Park | |
| 6,768,775 | B1 | 7/2004 | Wen | |
| 6,771,828 | B1 | 8/2004 | Malvar | |
| 6,774,912 | B1 | 8/2004 | Ahmed | |
| 6,781,601 | B2 | 8/2004 | Cheung | |
| 6,785,700 | B2 | 8/2004 | Masud | |
| 6,798,838 | B1 | 9/2004 | Ngo | |
| 6,806,885 | B1 * | 10/2004 | Piper et al. | 345/545 |
| 6,807,308 | B2 | 10/2004 | Chui | |
| 6,816,194 | B2 | 11/2004 | Zhang | |
| 6,826,242 | B2 | 11/2004 | Ojard | |
| 6,834,123 | B2 | 12/2004 | Acharya | |
| 6,839,079 | B2 | 1/2005 | Barlow | |
| 6,842,777 | B1 | 1/2005 | Tuli | |
| 6,847,468 | B2 | 1/2005 | Ferriere | |
| 6,850,571 | B2 | 2/2005 | Tardif | |
| 6,850,649 | B1 | 2/2005 | Malvar | |
| 6,853,385 | B1 | 2/2005 | MacInnis | |
| 6,868,083 | B2 | 3/2005 | Apostolopoulos | |
| 6,898,583 | B1 | 5/2005 | Rising | |
| 6,931,458 | B2 * | 8/2005 | Bolian et al. | 710/15 |
| 7,293,165 | B1 * | 11/2007 | Tobias | 713/1 |
| 7,437,225 | B1 * | 10/2008 | Rathinam | 701/14 |
| 2001/0003846 | A1 * | 6/2001 | Rowe et al. | 725/47 |
| 2004/0199698 | A1 * | 10/2004 | Bolian et al. | 710/305 |
| 2005/0204015 | A1 | 9/2005 | Steinhart et al. | |
| 2006/0184349 | A1 * | 8/2006 | Goud et al. | 703/24 |
| 2006/0222078 | A1 * | 10/2006 | Raveendran | 375/240.16 |
| 2007/0033496 | A1 * | 2/2007 | Cooklev et al. | 714/776 |

OTHER PUBLICATIONS

Lamm, J.D., "Digital Packet Video Link—A VESA Proposed Standard," SID 03 Digest, 2003, pp. 1021-1023, ISSN/0003-0966X/03/3402-1021.

Skodras et al., "JPEG2000: The Upcoming Still Image Compression Standard," May 11, 2000, 14 pages.

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

* cited by examiner

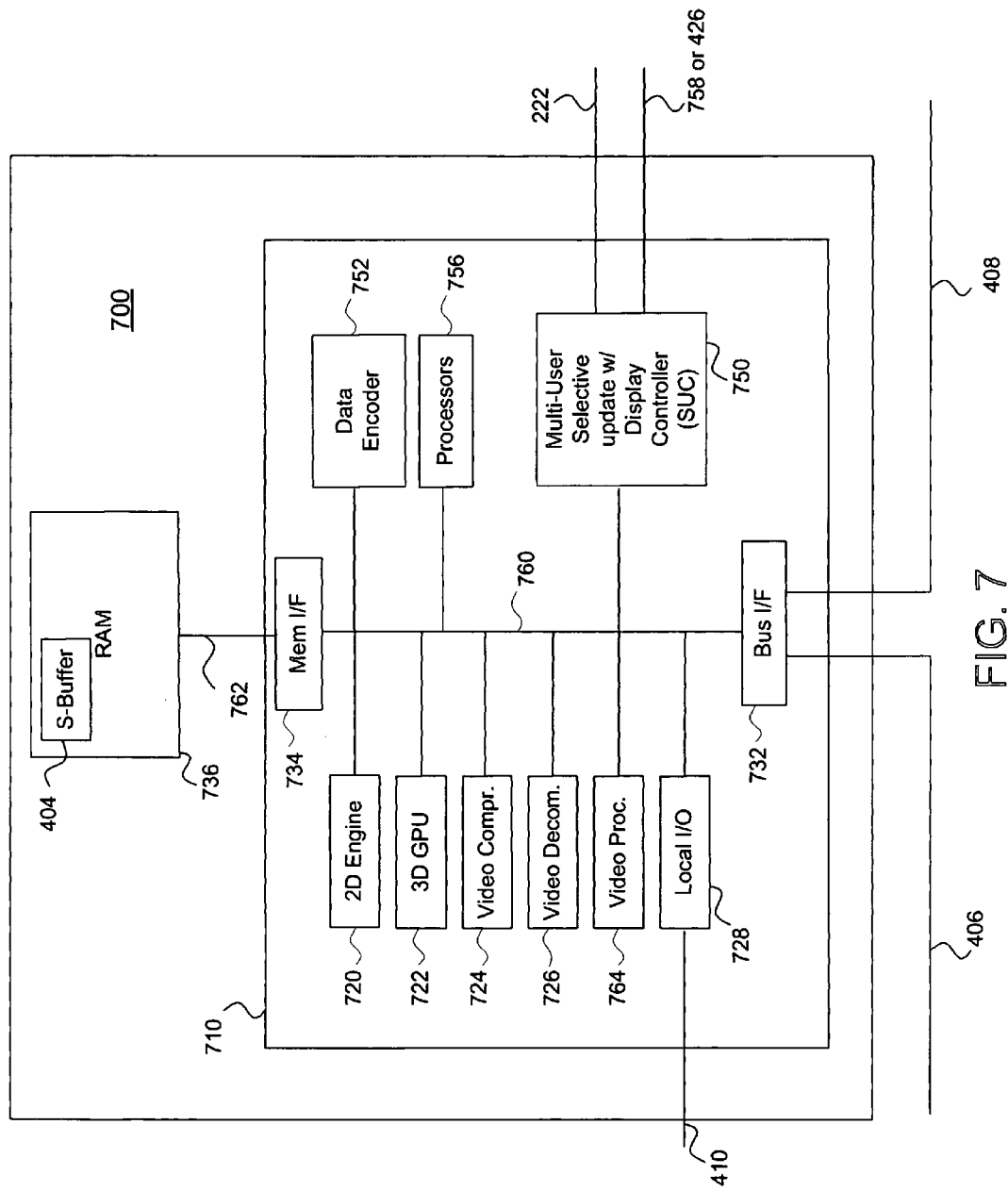

MULTI-USER DISPLAY PROXY SERVER

BACKGROUND OF THE INVENTION

1. Technical Field

The present invention relates generally to a multi-user host computer system, and more particularly to utilizing a proxy server to support terminal services for remote clients.

2. Discussion of Background Art

Developing efficient multi-user host computer systems is a significant objective for contemporary system designers and manufacturers.

Conventional computer systems may utilize a local display device to display output directly to one user. The local display device is typically positioned close to the computer system because of restrictions imposed by various physical connections that electrically couple the display device to the output of the computer system. Some computer systems may support a second display device that has similar proximity restrictions due to the physical connections.

Remote users require the additional flexibility of choosing an appropriate viewing location and network connection to the host system. For example, in a corporate environment, a business may wish to keep all of the host computers in a secure central "Computer Room" that has both physical security and environmental management such as air conditioning and power back-up systems. However, it is necessary for users to utilize the host computer systems from their offices and from desks located outside the "computer room."

The typical office environment today includes personal computers and increasingly more thin clients physically located at the users' locations. These personal computers and thin clients operate on a network having a centralized system for storage, file serving, file sharing, network management and various administrative services. Initially, systems centralized all of the disk storage associated with the computer system while users ran applications on their local desktops. More recently, recognizing the benefits of security, reduced cost of operation, and the general desire for centralizing control, personal computers and thin clients can operate as Remote Terminals (RTs) in Server Based Computing (SBC) solutions which run applications on a server.

The traditional approach for RTs in an SBC environment is for the host system to use some form of a server to client communication exchange such as Microsoft's Remote Display Protocol (RDP). RDP uses its own video driver on the server and uses the RDP protocol to construct the rendering information into network packets and sends them over the network to a client. The client receives rendering data and interprets the packets into corresponding Microsoft Win32 Graphics Device Interface (GDI) API calls. Support for redirecting the client keyboard and mouse commands to the server as well as managing local audio and local client drives is also included.

To enhance the communication between the host system and the clients, other systems have used the main CPU of the host system to improve the performance for RTs. This has been done both for thin clients and for traditional PCs as the remote clients. Such approaches have been effective for host systems that support only one user at a time. However, for multi-user systems, the approach of using the main CPU at the host to improve the performance for any one user has significant limitations. Computational resources such as main memory and CPU cycles that are used for optimizations for one user may reduce the ability to support the workload for additional users.

Efficiently supporting multiple users from a single host computer can reduce costs. In a typical office environment, seldom is everyone using their computer at the same time and similarly, seldom is any one user using all of the computing resources of their computer. So for example, a company with one hundred offices may only need a system that supports sixty users at any one time. Even with that said, such a system could be designed to support all hundred users giving them enough computing throughput to give the appearance that they each had their own host computer. In a distributed office environment a centralized multi-user system may be connected over varied bandwidth links to support RTs at locations in different parts of the world during the different working hours for the respective time zones.

Server Based Computing, where the applications for users run on the server with only RT services supported at the user's terminal, is another way to more effectively allocate computing resources for multiple users. SBC allows the host system to dynamically allocate shared resources such as memory and CPU cycles in a multi-user operating environment. SBC systems can employ techniques of multi-user operating systems, Virtual Machines (VM), load balancing and other means to grant different users access to different levels of performance and resources based on a number of criteria. Different priority schemes can be used to allocate SBC resources. SBC can achieve higher data security, centralize the support for an organization, enhanced disaster recovery and business continuance, and reduce data storage requirements across an organization. Web servers are one type of SBC which may provide a multi-user platform for a variety of clients including browser based clients.

Blade based servers implement an effective architecture for scalable multi-user host systems. The partitioning of the blades computational functions, I/O functions, the backplane architecture and the switching are all important in the design of a blade based server. Each blade may constitute the functions of a complete computer or a blade server may share significant functions across blades. With CPUs ever increasing their performance by including multiple processor cores, the limitation of a single user to a single blade makes decreasing economic sense. Each blade in a blade server system may need to be monitored remotely. With the multi-function nature of the blade system, a rack of blades may need to be configured to best match different workloads.

FIG. 1 shows a representative prior art multi-blade system-level architecture 100 including blades labeled one through eight (102, 104, 106, 108, 110, 112, 114 and 116) along with switches 120 and 122 and paths through each of the switches. The switches also may include paths between them as well as to link 124 that may further expand a rack of blades to another rack of blades or to some other subsystem. The blades of FIG. 1 may vary in number and each blade may be a processor blade, an I/O blade, a switching blade or some combination of the three. The I/O blades may include their own external interfaces as illustrated by Blade 4 108 path 180 and by Blade 8 116 and path 190. Examples of external interfaces may include non-network interfaces such as Fiber channel and iSCSI or network interfaces such as Ethernet and 10G Ethernet, The example switch matrix of Switch1 120 and Switch2 122 shows connections 140 and 142 from each switch to each blade. The types of physical or logical transport for each switch may be the same or different. A path 144 may connect or bridge together the switches 120 and 122. The combination of switches and connections is referred to as a switch fabric 150 which may be distributed on each blade, part of the backplane, implemented on switching blades or may involve a combination of the three. The paths for the switching fabric may be unidirectional, bidirectional or a combination. Each blade may connect to any number of switches and may include a bridging function for different switches as part of the blade function. A more advanced system may include a full mesh topology fabric and may have redundancy.

Some examples of connections used for the switch fabric 150 include one or more channels of Peripheral Component Interconnect (PCI) Express, 10G Attachment Unit Interface (XAUI), Infiniband, RapidIO, StarFabric, Advanced Switching Interconnect (ASI), Gigabit Ethernet, Fiber Channel, as well as other electrical and optical interconnects. In some cases, the functional chips of each blade may directly include a fabric interface 130. In other cases the blades may include fabric interface chips or bridge chips that perform the interfacing. The fabric and bridge chips within each blade may connect to one or more of the system switches and may integrate an additional bridging function between the switches.

However, an increased complexity may be required for a blade based multi-user host computer to effectively manage, control and deliver rich application performance for a variety of server software and web based applications and the variety of RT devices that an organization may have. A solution is needed that allows a blade based multi-user host server to more efficiently support numerous remote users with outstanding computing and display performance.

SUMMARY

The present invention provides an efficient architecture for a blade based multi-user computer system, including one or more Remote Terminals (RT) capable of interactive graphics and video, which generally manages applications and performs server based computing. Each RT has its own keyboard, mouse and display and possibly other peripheral devices. The RTs provide individual users with access to the applications available on the server as well as a rich graphical user interface. The multi-user computer system may run a multi-user operating system, may run virtualized instantiations of a single user operating system, may run a web server engine for multiple users, may run a proxy server or may run some combination thereof In the first preferred embodiment, processor blades include a Baseboard Management Controller (BMC) that allows remote management and control from an RT. In additional to providing sensor and status information, the BMC includes the Keyboard, Video and Mouse (KVM) capabilities so that a system administrator can access the processor blade remotely as if he were connected locally to the blade. The BMC and KVM functions support "out of band" operations without making additional run time changes to the base operation of the CPU and board so that diagnosis of run time issues may be performed most efficiently. The display related features of the remote KVM are supported by a graphics processor and display data encoder which utilize selective updates and, where required, various forms of display data compression. The display data encoder function may be integrated into TSA 424 or as a dedicated data encoder 752 for a combined GPU-TSA.

In a second preferred embodiment, a Terminal Services Blade (TSB) utilizes a combination of software, a graphics processor, and data encoding to support multiple RTs by creating a virtual display environment for each RT. The most common methods for communication with the RT include sending an encapsulated graphics command or sending encoded sub-frame data. The software to manage the RTs can run on the main host processor blade, the CPU of the TSB, on a Terminal Services Accelerator (TSA), on the RT or on a combination thereof. The selective updates for each RT can be coordinated in software or with the assistance of hardware in a Multi-User Graphics Processor Unit (MU-GPU) or a combined TSA-GPU. The graphics processor may follow the proposed VESA Digital Packet Video Link (DPVL) standard or an improved method using some combination of headers, status bits and signatures for the sub frames. In other enhancements, PCI express or another bus is used instead of DVI for the output data, additional data encoding is performed either within the graphics processor or with an encoder attached to the graphics processor, and the software utilizes one or more graphics processors for multi-user support.

The TSB may perform varying levels of proxy serving including client termination and may go as far as to completely emulate multiple RDP clients such that the RDP host running on the processor blades considers a process running on the TSB to be the only known client. In this method, the TSB can create a completely independent interface to the RT that the host processor is unaware of. This type of interface between the TSB and an RT may be of the form of a split proxy. As a split proxy, the TSB and RT communicate over a private channel on which they can communicate more efficiently than they could using a more standard protocol such as RDP or web browser protocol.

For additional efficiency, the processor blades may run tracking software that can be combined with the TSA to intercept functions such as video playback. Instead of having the host CPU perform the video decode locally and supply the bitmaps for transport to the RTs, the TSA can intercept the video data stream prior to decode by the CPU and may communicate the native video stream or a modified version, such as a transcoded or transrated version, to the target RT. The communication to the RTs may employ other private channels in addition to the standard RDP channels while still being managed within the RDP protocol.

In each embodiment, after the graphics operations and selective update process, the data is encoded and then encapsulated into a network ready update packet. A network I/O blade, network processor, or a CPU working in conjunction with a simpler network controller, transmits the graphics packet over a wired and/or wireless network(s) to an RT. In some KVM configurations, the BMC will perform the network processing so that the processor blade CPU is not disrupted by the update packet operation. In another configuration, the CPU utilizes "Virtual Technology" to protectively partition, and performs both the operating system functions including user tasks as well as the out of band management tasks of the BMC. The BMC may communicate with another network controller or network physical layer (PHY) in the system. Each RT system decodes the graphics packet intended for its display, manages the frame updates and performs the necessary processing for the display screen. Other features, such as masking packets lost in network transmission, are managed by the remote display system(s). When there are no new frame updates, the remote display controller refreshes the display screen with the data from the prior frame.

The various network systems may feed back network information from the various wired and wireless network connections to the TSB. The TSB uses the network information to affect the various processing steps of producing RT updates and, based on the network feedback, can vary the frame rate and data encoding for different RTs. Additionally, for systems that include a network having noisy transmission channels, the encoding step may be combined with forward error correction protection in order to prepare the transmit data for the characteristics of the transmission channel. The combination of these steps maintains an optimal frame rate with low latency for each of the RTs. The TSA and TSA-GPU may be implemented as a separate subsystem or combined with other offload and acceleration processing such as the network processor, security processor, XML accelerator, iSCSI processor or any combination of these.

Therefore, for at least the foregoing reasons, the present invention effectively implements a flexible blade based multi-user computer system that utilizes various heterogeneous components to facilitate system interoperability and functionality. The present invention thus efficiently implements an enhanced blade based multi-user server.

BRIEF DESCRIPTION OF THE DRAWINGS

FIG. 7 is a block diagram showing details of an exemplary System-On-Chip (SOC) Terminal Services Accelerator with an integrated Graphics Processor Unit (TSA-GPU 700) of FIG. 4;

DETAILED DESCRIPTION OF THE PREFERRED EMBODIMENTS

Figure 1:
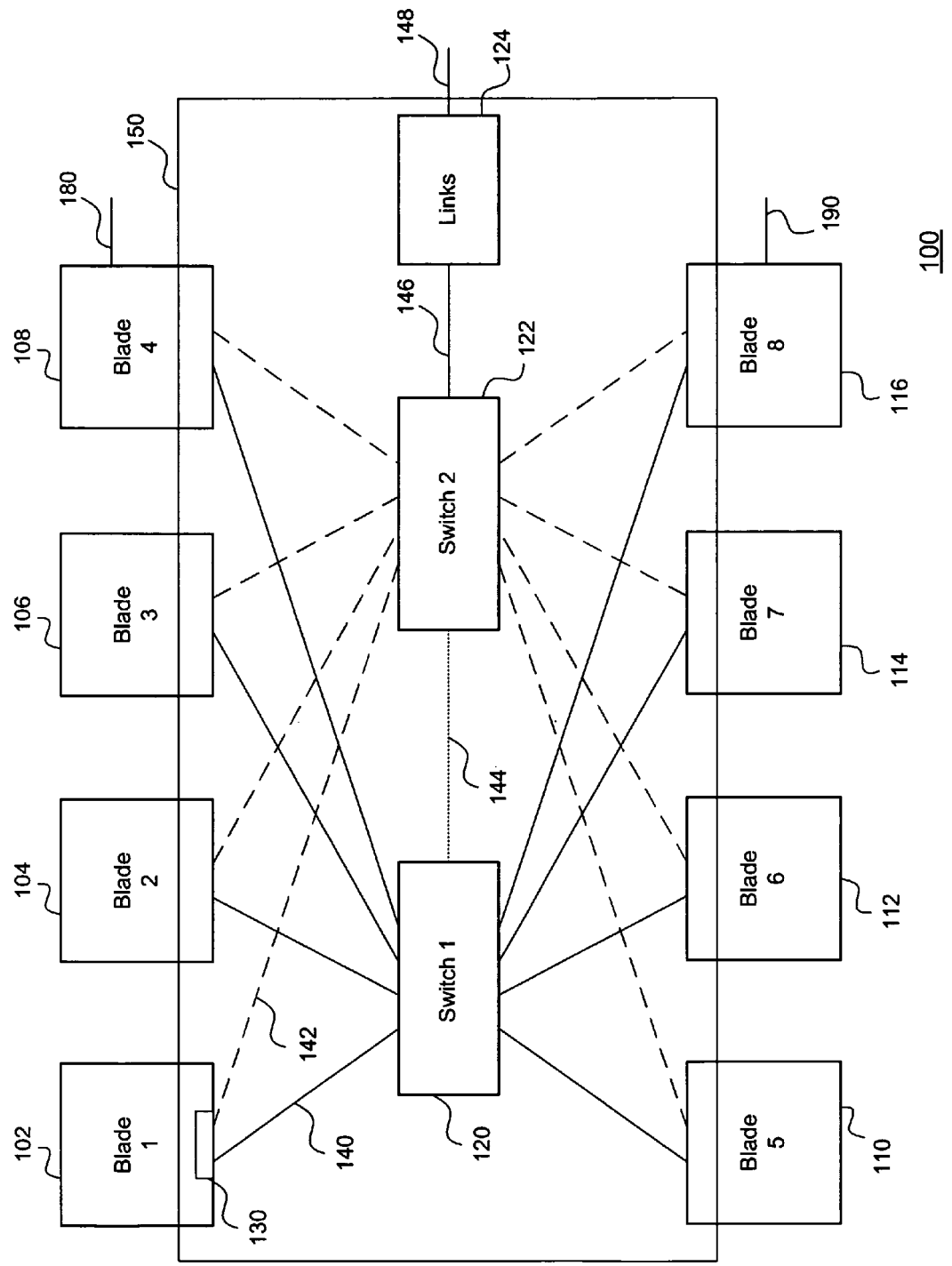
FIG. 1 is a block diagram of a prior art blade based multi-user computer system including multiple blades and a switching fabric.

The present invention relates to an improvement in blade based multi-user computer systems with support for remote terminals. While the described embodiments relate to blade based multi-user computer systems, the same principles and features could be equally applied to other types of single and multi-user systems and other types of remote terminals.

The blade based multi-user computer system 100, also referred to as "host 100," is designed to support multiple users at Remote Terminals as described below with reference to FIG. 3. Each RT is able to time-share the host 100 as if it were their own local computer and have complete support for all types of graphics, text and video content with the same type of user experience that could be achieved on a local computer. Paths 180 and 190 when used a network connection correspond to FIG. 2 path 290 and FIG. 4 path 490 which may connect to FIG. 3 network path 390. In additional to the RT connections, host 100 may be connected through link 124 to a WAN, storage subsystem, other hosts or a variety of other data center connections which may take the form of GigE, 10G Ethernet, iSCSI, Fiber Channel (FC), Fiber Channel IP (FCIP) or another electrical or optical connection. The host 100 may support a variety of multi-user Operating Systems (OSs) or software that virtualizes a single user OS may be deployed on one or more of the processor blades. An operating system such as Citrix or Windows Server is designed as a multi-user OS. Windows XP, though not specifically designed for simultaneous multiple users, can be used in such a configuration with the help of either lower level virtualization software, such as VMWARE or XenSource, or another means to perform user switching so quickly as to appear as a multi-user OS. Different management controls may allow RTs and programs to statically or dynamically be moved from processor to processor. Load balancing may be performed by the OS for each processor or the system may perform load balancing across multiple processors. Host 100 may also run a type of web server and support multiple users through web based interfaces. The host 100 may function as a proxy server for various RTs and communicate with application servers or web servers.

Figure 2:
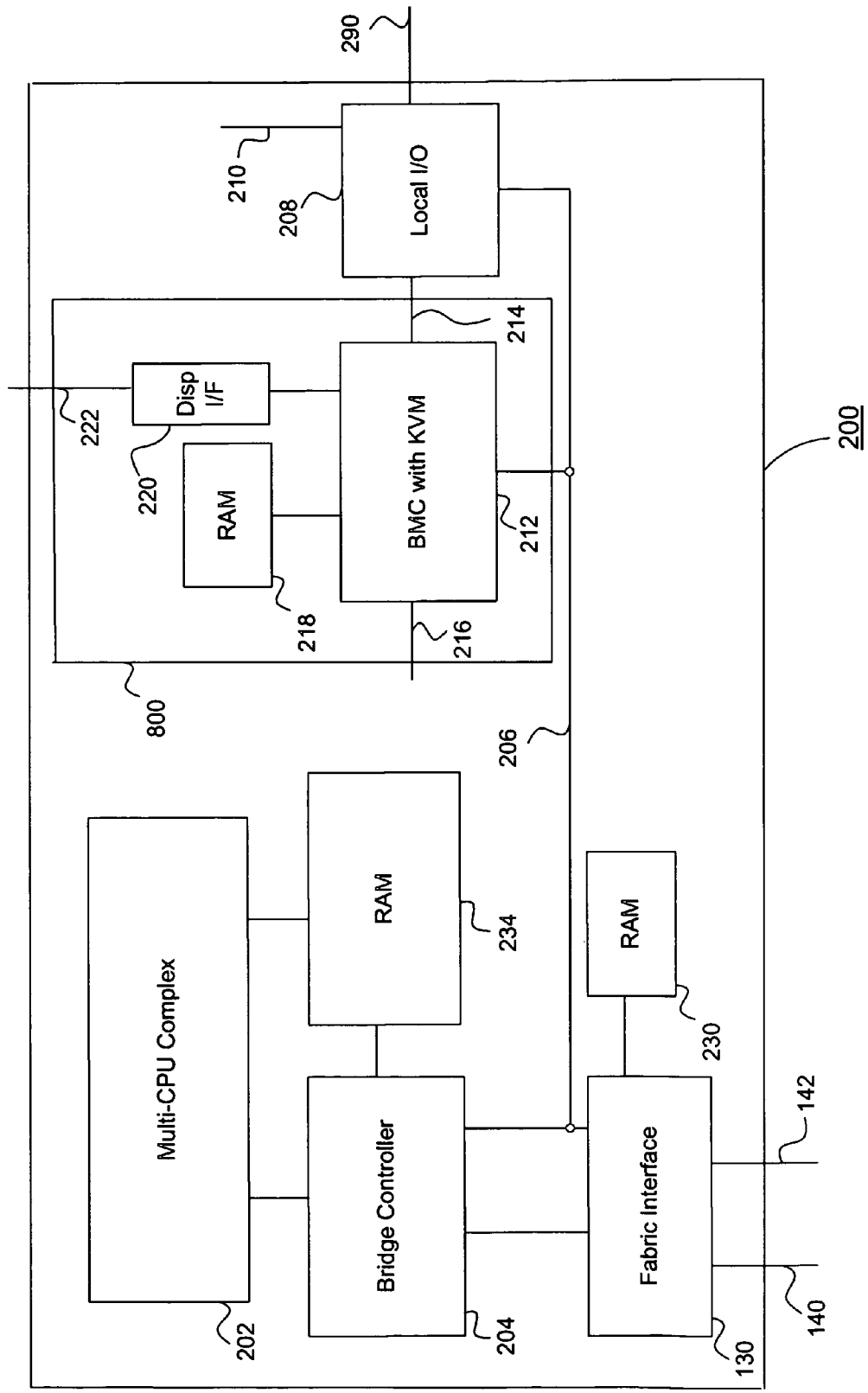
FIG. 2 is a block diagram of a multi- CPU processor blade having a multi-CPU complex and a Baseboard Management Control (BMC) with remote Keyboard, Video and Mouse (KVM) support in accordance with a first embodiment of the invention.

FIG. 2 is a block diagram of one embodiment of a Processor Blade 200 which could serve as one of the blades 102-116 of a blade based multi-user server system 100. Each blade 200 may be a host computer by itself or multiple blades can be racked together to create a more capable host computer. The more processor blades, I/O processing and CPUs that a host has, the more users can be simultaneously supported. The basic components of processor blade 200 preferably include, but are not limited to, a multi-CPU Complex 202, a bus bridge-controller 204, a main system bus 206 such as PCI express, local I/O 208, main RAM 234, a Fabric Interface (FI) 130 to connect to the switches, backplane and other blades, and optionally a Baseboard Management Control (BMC) subsystem 800.

Depending on the type of transport and physical layer interfaces of the switch fabric 150, the fabric interface (FI) 130 may include significant processing. For example, the fabric interface 130 may include a 10G Ethernet processor (not shown) that performs all of the necessary packet level filtering and processing both for locally generated packets and for the ASI fabric interface. Such a fabric interface processor may require external RAM 230 or may have sufficient internal storage. The network physical layer interface (PHY) may be integrated with the FI processor or may utilize external PHY components. The local I/O 208 and local I/O connections 290 may be controlled by this same FI processor. Additionally, instead of interfacing with the system bus 206 through a bridge controller 204, the fabric interface 130 may attach directly to the system bus 206.

In one example system, Switch1 120 and the associated paths 140 utilize the ASI bus protocol which allows tunneling of PCI Express packets. Switch2 122 and the associated paths 142 may be a XAUI style bus and may be more optimized for storage and networking and may utilize 10G Ethernet protocols. The system may primarily utilize the ASI bus for communication between different processor blades and the XAUI bus for communicating with networking and storage blades. Each blade may include one interface, both interfaces or with both interfaces also include the ability to bridge traffic transfers between the two buses.

The FIG. 2 multi-CPU complex 202 may include one or more processor chips each having one or more CPU cores (not shown) which may each execute multiple simultaneous threads. At each level, each CPU core may include either dedicated cache memory and at some levels multiple CPU cores may share cache memory. The multi-CPU complex 202 may control and access RAM 234 independently or it may utilize the bridge controller 204 for performing RAM 234 accesses. In some other configurations, the multi-CPU complex 202 may directly interface (not shown) to the main system bus 206.

The local I/O 208 may include various I/O interfaces and controls both for external interfaces 290 and via path 210 for resources located within the processor blade 200. The major I/O functions such as storage and networking may either be included on each Processor Blade 200 or other dedicated I/O blades may be supported over the switching fabric 150. Depending on the choice for the physical and logical connections of the switch fabric, the interfaces 140 and 142 may be directly integrated into a bridge controller 204 or may require a fabric interface 130 chip.

Because each processor blade 200 may effectively be a "computer system," having a way to observe and manage the system is highly desirable. Since a host 100 may be located in a special computer room, it is often desirable to allow the system to be observed and managed from remote terminals (RTs) 300. RTs may be specially designed thin clients, or for management functions are more typically computers running management software. Alternatively, the RTs may include browser based software for performing the management functions. The processor blade 200 may include a web server for providing a user interface for browser based management.

When a processor blade 200 is being administered and not under a workload from remote users, the main CPU of multi-CPU complex 202 is often used for communicating with the RT. However for monitoring various environmental conditions and for observing and managing the processor blade 200 while it is executing a workload from remote users, it is desirable to include a Baseboard Management Control (BMC) subsystem 800 as detailed in FIG. 8.

As an alternative or adjunct to a separate CPU in the BMC 800, the main CPU in 202 can use virtualization technology to isolate the management functions from the operating system and user functions. While in a multi-core CPU 202 a specific core may be dedicated to such a management function, a properly designed CPU may include hardware, such as the Intel Vanderpool VT technology, to allow tasks or threads to be isolated from each other independent of what core they are running on. As such, a single CPU core may simultaneously both run a protected virtual management machine mode for supporting out of band management functions and run an operating system virtual machine mode to support various operating system and user tasks.

The different virtual machines of a CPU core may each operate in conjunction with different aspects of a BMC 800. In a preferred embodiment, BMC with KVM 212 includes a local graphics processor such as MU-GPU 412 of TSA-GPU 700 that performs the display processing for the standard operating system running in a virtual machine mode. For remote KVM operation, a remote administrator may wish to observe or perform out of band management of the processor blade 200. A protected virtual management machine mode of the host CPU 202 may be used to assist in performing the out of band remote administration. The remote KVM administration may include accessing the same local graphics processor display but from the out of band network interface. Such access to the graphics processor display may utilize the more advanced features of the TSA-GPU 700 detailed in FIG. 7 In another embodiment, a separate CPU 808 within BMC with KVM 212 is used for managing the out of band remote administration instead of using a protected virtual management machine mode on the host CPU.

Figure 3:
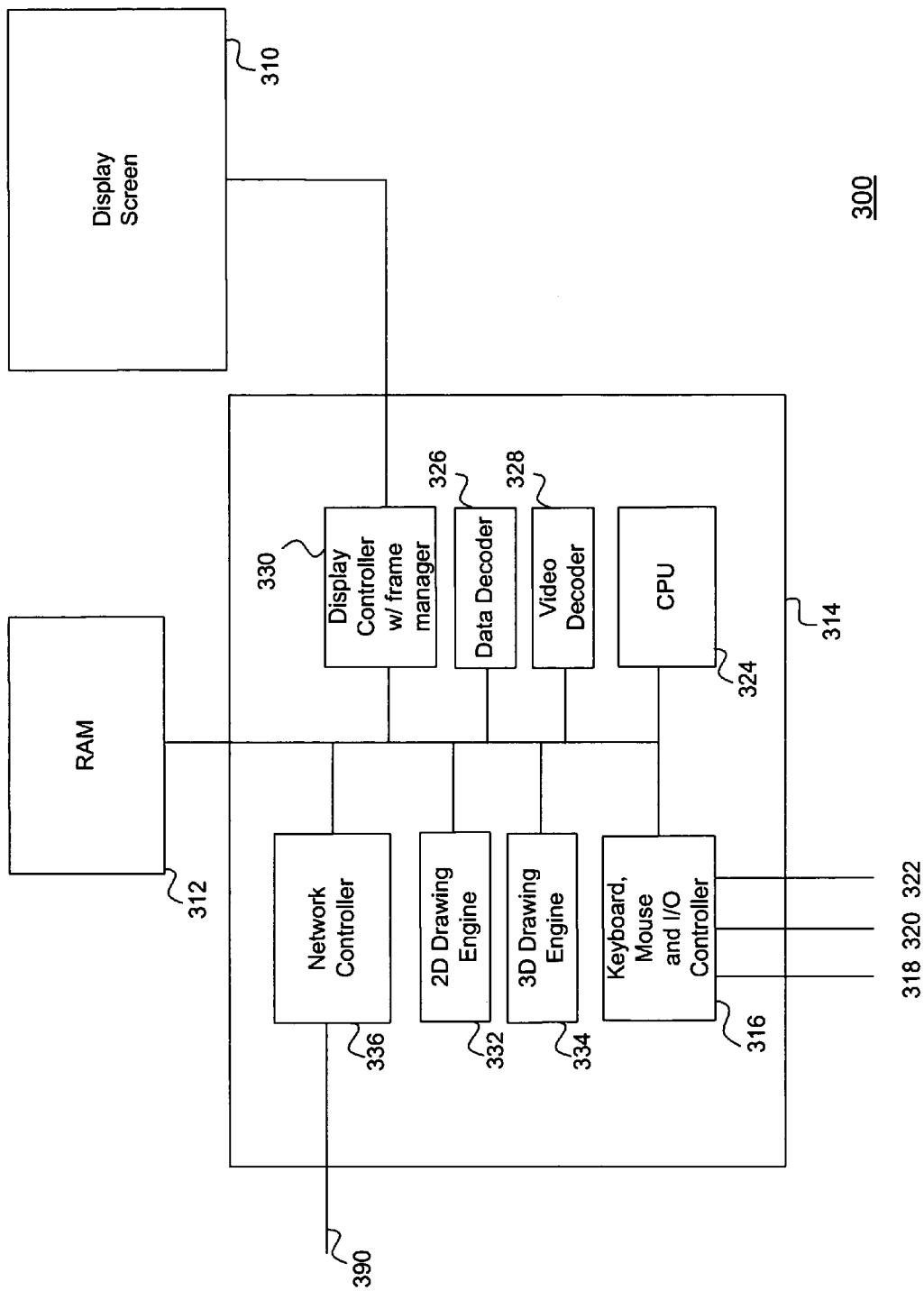
FIG. 3 shows an RT which is connected over a network with the blade based multi-user computer system of FIG. 1.

FIG. 3 is a block diagram of a Remote Terminal 300, in accordance with one embodiment of the invention, which preferably includes, but is not limited to, a display screen 310, a local RAM 312, and a Remote Terminal System Controller (RTSC) 314. The RTSC 314 includes a keyboard, mouse and I/O control subsystem 316 which has corresponding connections for a mouse 318, keyboard 320 and other miscellaneous devices 322 such as speakers for reproducing audio or a Universal Serial Bus (USB) connection which can support a variety of devices. Other integrated or peripheral connections for supporting user authentication via secure means, including biometrics or security cards, may also be included. The connections can be dedicated single purpose such as a PS/2 style keyboard or mouse connection, or more general purpose such as USB. In other embodiments the I/O could include a game controller, a local wireless connection, an IR connection or no connection at all. Remote terminal system 300 may also include other peripheral devices such as a DVD drive.

Some embodiments of the invention do not require any external inputs at the remote terminal system 300. An example of such a system is a retail store or an electronic billboard where different displays are available at different locations and can show variety of informative and entertaining information. Each display can be operated independently and can be updated based on a variety of factors. A similar secure system could also include some displays that accept touch screen inputs, such as an information kiosk or Automated Teller Machine (ATM) at a bank. Other secure systems, such as a game machine for a casino, could also be based on this type of RT.

The FIG. 1 host 100 may include networking interfaces (e.g., 180, 190) from each blade or a shared network controller may be included. In either case, a network connection is established from the host 100 to input 390 of the RT 300. Network controller 336 supports secure protocols on the network path 390 which could be wired or wireless and the data traveling over the network can be encrypted via a key exchange. A common network example is Ethernet, such as CAT 5 wiring running some type of Ethernet, preferably gigabit Ethernet, in which the I/O control path may use an Ethernet supported protocol such as standard Transport Control Protocol and Internet Protocol (TCP/IP) or some form of lightweight handshaking in combination with UDP transmissions. Industry efforts such as Real-time Streaming Protocol (RTSP) and Real-Time Transfer Protocol (RTP) along with a Real-Time Control Protocol (RTCP) can be used to enhance packet transfers and can be further enhanced by adding re-transmit protocols. Other newer efforts around using Quality of Service (QoS) efforts such as layer 3 DiffServ Code Points (DSCP), the WMM protocol as part of Digital Living Network Alliance (DLNA), Microsoft Qwave, uPnP, QoS and 802.1P are also enhanced ways to use the existing network standards.

In addition to the packets for supporting the I/O devices, the network carries the encapsulated and encoded display commands and data required for the display. The CPU 324 coordinates with the network controller 336, 2D drawing engine 332, 3D drawing engine 334, data decoder 326, video decoder 328 and display controller 330 to support all types of visual data representations that may be rendered and displayed locally on display screen 310. There is no requirement that an RT include any particular combination of the display processing blocks. An extra thin RT may include as little as just a display controller 330 with a CPU doing the display processing though having at least one type of decoder or drawing engine is more likely.

The various processing elements may decode packets that represent an entire frame or packets that represent various sub frames of display data. In one preferred embodiment, the packets include various slices of encoded display data that correspond to fixed positions of the display. The CPU 324 may receive the packets and by reading the header information for the packets determine the appropriate location of the display that the packed is intended for. The appropriate resource, such as the data decoder 326, is used to decode the slice of data and the decoded data is transferred to the appropriate position within the display memory. The data decoder 326 may be set up to produce the decoded data directly into the display memory position or the data may be decoded to another area and transferred by the 2D drawing engine 332, the CPU 324 or by another means to the intended position.

The RT 300 can be first initialized either by booting out of a local FLASH memory (not shown) with additional information being provided over the network 190/390 by the host 100. During the initialization sequence for the RT, the connection between the RTSC 314 and the display screen 310 may be used in a reverse direction or bidirectional mode utilizing standards such as Display Data Channel (DDC) Interface, Extended Display Identification Data (EDID) and other extensions to identify the display monitor capabilities. A USB connection via keyboard, mouse and I/O controller 316 may also be used in the connection to the display screen 310. The information such as the available resolutions and controls are then processed by the CPU 324. System 300 may implement a protocol such as uPnP or another discovery mechanism where it is able to communicate with the host 100. During that initialization communication, CPU 324 may provide the RT information, including the display monitor information, to the Host 100 so that each RT can be instantiated at the host side.

The initial display screen may come from either the FLASH memory or from the host 100. Following a first full frame of display data, the host computer 200 need only send partial frame information over the network 390 as part of the display update network stream. If none of the pixels of a display are changed from the prior frame, the display controller 330 can refresh the display screen 310 with the prior frame contents from the local RAM storage 312. The output of the RTSC 314 may be encrypted using a protocol such as HDCP. If display screen 310 is connected by a cable, such as with DVI, HDCP may be a requirement for playing back content that has DRM. RTSC 314 may additionally be designed to provide a highly secure processing environment where the various encryption keys are never exposed outside the chip. In an even more secure implementation, none of the decrypted content data would ever be in the clear outside of the chip. To achieve such a secure system, RTSC 314 may utilize local cryptography methods independent of the key exchanges performed with the host 100 and the display screen 310.

Display updates are sent via the network stream, and may consist of encapsulated 2D drawing commands, 3D drawing commands, encoded display data or encoded video data. The network controller 326 receives the network display stream and the CPU 324 determines from the encapsulation header which of the functional units 332, 334, 326 and 328 are required for that packet. The functional units perform the necessary processing steps to draw or decode the image data and update the appropriate area of RAM 312 with the new image. During the next refresh cycle, the display controller 330 will use this updated frame for display screen 310.

The display controller 330 transfers a representation of the current image frame from the RAM 312 to the display 310. Typically, the image will be stored in RAM 312 in a format ready for display, but if RAM cost is an issue, the image or portions of the image can be stored in the encoded format. External RAM 312 may be replaced by large buffers within the remote terminal system controller 314. Display controller 330 may also be able to combine two or more display surfaces stored in RAM 312 to composite an output image for display by screen 310. Different blending operations may be performed along with the compositing.

CPU 324 communicates with TSB 400 (FIG. 4, discussed below) to best set up and manage the overall display operations for the RT. Initial setup may include enumerating the types of functions supported in the RTSC 314, specifications of display screen 310, amount of RAM 312 available for buffering and caching data, command set supported by the 2D drawing engine 332, command set supported by the 3D drawing engine 334, formats supported by the data decoder 326, formats supported by video decoder 328 and the capabilities of display controller 330. Other management optimizations at run time include managing and caching display bitmaps in RAM 312 so they do not need to be resent.

The configuration for the RT 300 may include a basic data decoding architecture or software running on a more conventional CPU-based platform and may be based on an Internet browser architecture. As part of an Internet browser architecture, the functional units may be used by a special browser that directly calls the functional units, by a browser that includes "plug ins" or drivers to make use of the functional units, or a more standard browser may use a local agent that acts as an intermediary to determine which requests can be fulfilled locally and which require communication with the web application on the host system. "Asynchronous Java Script language and XML" (AJAX) and other derivatives such as "Asynchronous Flash and eXtensible Markup Language" (AFLAX) are such agent based techniques and may make use of a combination of XHTML, Document Object Model manipulated through JavaScript and "XMLHttpRequest" to exchange data asynchronously with the web server to improve the user interface at the client. AJAX may be used to perform selective requests where the data decoding at the client side uses the functional blocks of RT 300.

The agent-based selective requests from an Internet browser based RT 300 may be supported by the host processor blade 200 and the terminal services blade 400 to further optimize the overall system. Additional communication protocol handling may be performed by an AJAX agent. Other example AJAX operations may include management of security keys and DNS lookups. An AJAX based agent on the RT may utilize host processor blade 200 or TSB 400 as a proxy to an application server or web server. The AJAX based agent may include special communication mechanisms and operate as a split proxy with the host processor blade 200 or TSB 400 providing the other portion of the proxy.

Figure 4:
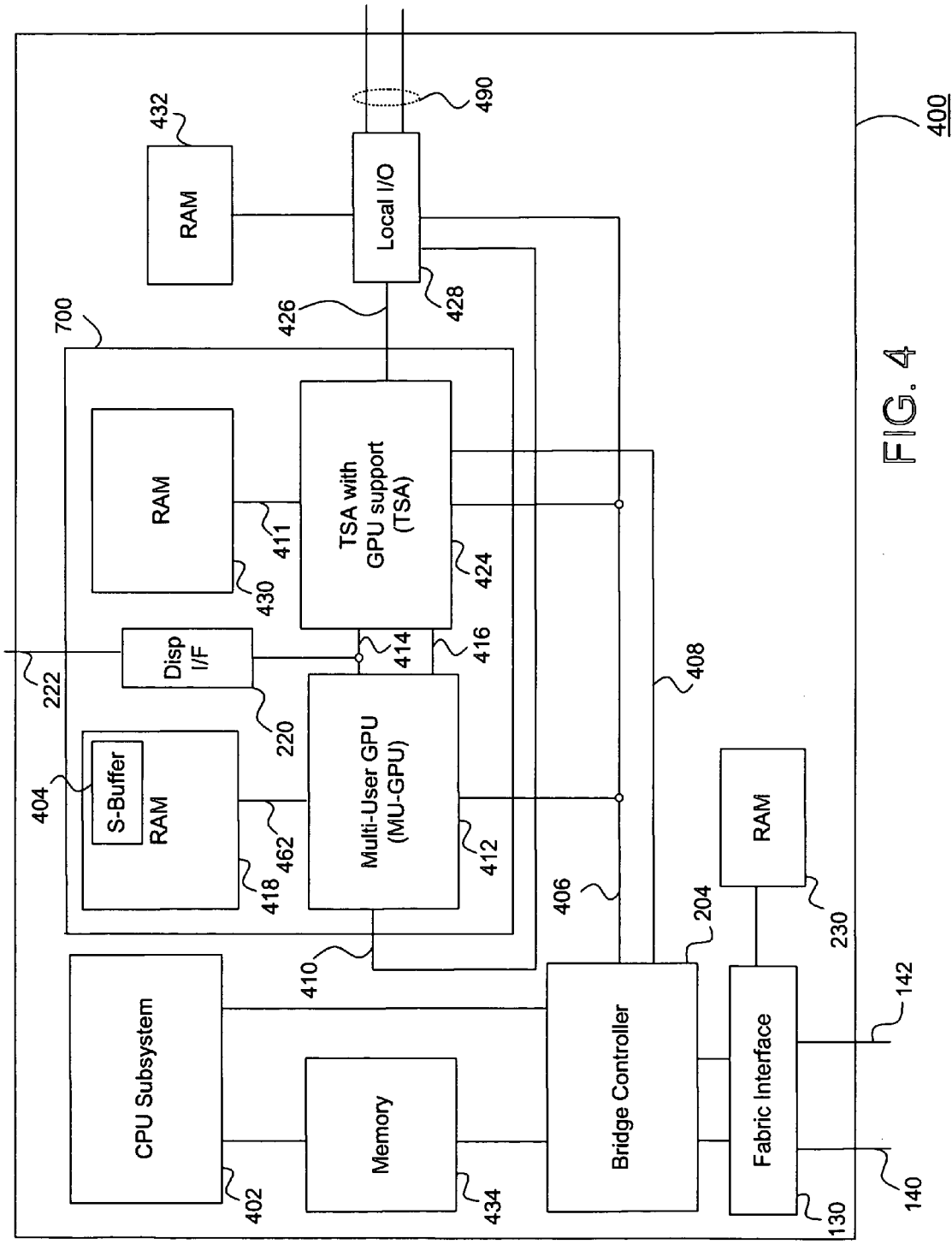
FIG. 4 is a block diagram of a Terminal Services Blade (TSB) in accordance with a second embodiment of the invention.

FIG. 4 illustrates a second preferred embodiment of a Terminal Services Blade (TSB) 400 for a blade based multi-user computer system 100, though TSB 400 may be alternately embodied as a separate computer or appliance that is attached via networking to a host processor. As an appliance, TSB 400 may include other non-network connections such as DVI or other cables to the display output of the server, and may include a local DVI output to preserve support for a local display device. Such a DVI output from the TSB 400 may either be a pass-through mode from the server or may go through a decode step when the data on the DVI cable is not suitable for a simple pass-through operation. TSB 400 may operate independently from a host processor to perform as a proxy server for multiple RTs.

TSB 400 includes a CPU Subsystem 402, memory 434, bridge controller 404, local I/O 428 with RAM 432 and the components that make up the Terminal Services Accelerator and Multi-User Graphics Processor Unit subsystem (TSA-GPU) 700. Bridge controller 404 may interface directly with the switch fabric or may include a fabric interface 130 for connection to switch fabric 140 and 142. The main functional units within the TSA-GPU 700 are the multi-user GPU (MU-GPU) 412 and the Terminal Services Accelerator (TSA) 424 which have associated RAMs 418 and 430 and may include a connection 222 via display interface 220. In some configurations, the TSA-GPU will have shared RAM and may be further integrated as described below in reference to FIG. 7.

A single TSB may perform the graphics operations for multiple processor blade 200s each having one or more CPUs each having one or more processor cores, with any number of virtual machines running on the mix of CPUs and processor cores. In some multi-user or multi-processor operating systems, requests to TSB 400 may be managed or performed in a coordinated fashion. For example, in the case of Microsoft Remote Desktop Protocol (RDP) or Citrix ICA based systems, the display commands are already virtualized and the processor blades 200 would not be attempting to directly access a graphics subsystem. Other multi-user or multi-processor operating systems may include a coordinated means to serialize accesses to a graphics subsystem and the TSB 400 combined with the operating system may allow the coordinated accesses to be properly mapped such that a single TSA 700 can support multiple displays for one or more multi-user operating systems.

However, in a virtual machine mode, the different virtual machines may not be aware of each other and each virtual machine may assume it has complete access to a dedicated graphics subsystem. In such a case, the TSB 400 needs to create a virtual abstraction layer to satisfy asynchronous commands and requests from multiple virtual machines in an orderly fashion and to properly support the resulting displays for the RTs. The TSB 400 may write graphics drivers for the different operating systems that may be run on different virtual machines of the processor blades 200. The TSB 400 would then coordinate the driver calls from the different operating systems into coordinated multi-display TSA 700 operations. Alternatively, each operating system would utilize a standard graphics driver and the TSB 400 would effectively need to intercept the driver calls. The intercepted driver calls would then be managed to operate the TSA 700 in a coherent multi-display mode and to appropriately manage the displays for each virtual machine.

In some systems, one of the functions of TSB 400 is to offload the Processor Blades 200 from some of the management for each of the RTs and to accelerate some of the offloaded processing so that each RT has improved display experience. The types of offload and acceleration support include encapsulating graphics operations into remote graphics commands, assisting in determining what capabilities and bitmaps are cached at each RT to determine which graphics commands are best suited, encoding and encapsulating bitmaps that need to be transferred to RTs, and best managing multimedia bitstreams. Alternatively, browser and agent based RTs may initiate more specific requests for host 100 to provide updates of graphics data which may be encoded by TSB 400 before transmission. In one preferred embodiment, the host system 100 is a web server where processor blade 200 performs the data base and "back end" operations of the web server function and TSB 400 operates as a media coprocessor managing the display elements for the web server function.

Additional functions such as inspection and encapsulation of eXtensible Markup Language (XML) traffic, Simple Object Access Protocol (SOAP), HTTP traffic, Java Virtual Machine (JVM) and other traffic associated with Internet based communication may also be supported. The processor blades 200 together with the TSB 400, while performing any desired anti-spam, anti-virus, content filtering, access restriction enforcement or other packet filtering based algorithms, can allow RTs to effectively perform remote access to the complete Internet. Such additional functions may be particularly useful for supporting RT Internet browsing using the host as a proxy for the web content accesses. Though there may be some redundancy in a system, this method may provide more specific user controls than more general network security appliances that are utilized between the host system and the WAN. The TSB 400 may provide other offload functions such as DNS lookup. Providing DNS lookup may allow a reduction on the number of TCP/IP connections that need to be set up and managed. The TSB 400 may also provide offload for security such as SSL. In addition, TSB 400 may provide certificate-based crypto algorithm support for secure clients.

A special proxy server on the TSB 400 may use other enhancements for Internet based traffic which may include reformatting or recoding Internet based content depending on the RT display device and the execution capabilities within the RT. For example, if the RT device is a cellular phone or Personal Digital Assistant (PDA) with a limited screen resolution, the TSB 400 can filter down high resolution content into lower resolution images for faster and more appropriate display. The TSB 400 may run other more intelligent content filtering and web page interpretation algorithms to perform functions like removing banner advertisements and other extraneous information so that the core information may be sent to the cell phone. TSB 400 may run a full web browser and the RT runs a less capable web browser or a micro-browser. The proxy functions of TSB 400 may translate advanced web formats into web format that can be comprehended by the browser of the RT.

Other types of web content, such as those utilizing Active-X controls, Macromedia Flash or other run time programs may not be compatible with devices such as a phone or PDA. The TSB 400 can act as an intermediary proxy server and transfer display data post- Active-X controls to an awaiting PDA. Application layer Regular Expression (RegEx) content processing may also be performed. Reformatting and re-coding may also be performed to increase security for clients. Whereas XML and SOAP may be subject to hijacking and other forms of passing of viruses, TSB 400 could recode XML and SOAP into a safe display format so that an RT client would not be subject to such risks.

In another embodiment, host 100 or more specifically TSB 400 is used as a more general multi-format network file proxy server for RTs to view files that they would otherwise not be able to read. For example, an RT may include a viewer for various display formats but may not include the ability to open and view an Adobe PDF file or a Microsoft Word document. The viewer on the RT may be a browser that supports various HTML and other web oriented formats. The host 100 may be able to open and view both an Adobe PDF file and Microsoft Word document. The host 100 may then use the functions of TSB 400 to translate the graphical output from the PDF file or Word document into a compatible display format for viewing on the RT. The RT may have network links to many types of data files and by utilizing a multi-format proxy viewer has the ability to view many types of files that would otherwise not be able to be decoded for viewing on the RT itself. This type of multi-format proxy viewing can be combined with a network file sharing function or with a mail server. For example, if the multi-format proxy viewer translates file attachments into a format that is viewable by a cell phone RT then it may be able to receive e-mails with a variety of attachments. The viewable attachments could be included with the mail message or a link to the viewable version of the attachments may be included in the mail message.

Multimedia bitstreams may include a video stream that is already in a compressed format and is being received at FIG. 2 processor blade 200 or FIG. 4 TSB 400. In some configurations, the multimedia bitstream will already be in a format that is compatible with the intended RT 300. In such a case, a software tracking layer running on processor blade 200 will direct the bitstream to TSB 400 which will encapsulate the bitstream into the appropriate packet format for transmission to the RT. Encapsulation may include adding header information, such as the origin for the video display window, or modifying packet organization, such as converting a transport stream into a program stream with different packet sizes.

In some other cases the multimedia bitstream will not be in a format readily handled by the target RT or not in a format appropriate for the network connection. In such cases, the TSB 400 operates as a transcoding proxy server and performs the more complex steps of decoding and re-encoding, transcoding or transrating the multimedia bitstream. For example, the incoming multimedia bitstream may be an encoded HDTV MPEG-2 stream. If the window size at the RT is set for a small 320×240 window, it may make sense to conserve network bandwidth and have the TSB 400 transcode and transrate the video into a lower bitrate representing the desired display window size. Similarly, if the incoming video was in a format that the RT was not capable of decoding, the TSB 400 may transcode the video into a compatible format. Even if the format is compatible, other incompatibilities such as the Digital Rights Management (DRM) or the encryption scheme may exist. The TSB 400 can also translate from one DRM or encryption scheme to a scheme suitable for the target RT.

For example, the content owner may use a DRM scheme based on a proprietary key exchange such as one used by Apple's iTunes. The TSB 400 may inspect the output of an iTunes video player running on either a processor blade 200 or on a local CPU 402 and capture the decrypted content. The decoded output may be still encrypted in HDCP if the output is from a DVI video bus. In the case of HDCP, TSB 400 needs to have the proper keys to decode the HDCP protected content and may act as a display device in order to perform the decryption. To preserve the content owner's control rights, the TSB 400 would then re-encrypt the content into a protocol that is understood by the remote client playback device. This may be based on a commercially available protocol such as Digital Transmission Content Protection (DTCP) or Microsoft's current format or may use a proprietary protocol. Once re-encrypted, the newly protected data stream can be transmitted over a network to a receiving device that has the proper decryption and display capabilities.

Some current versions of Microsoft's Remote Desktop Protocol (RDP) provide less efficient processing for compressed video bitstreams. With RDP, the drivers within the host system detect and decode the bitstream into a Device Independent Bitmap (DIB). The DIB is then translated into RDP transfer commands and the DIB format data is unreliably transferred over the network to the RT. In most cases, only a couple of frames of DIB data make it through to the RT for display. Thus, there is inefficiency in the host CPU performing decoding as well as in sending the decoded data over the network in a less efficient format. Other RDP based graphics operations make use of DIBs as well.

Conventional graphics bitmaps, such as those from a website, also need to be transferred from host 100 to an RT 300. The TSB 400 can perform various levels of encoding for conventional graphics bitmaps such as DIBs. The encoding for graphics bitmaps may be lossless or lossy with a goal of providing visually indistinguishable representations of the original graphics quality. A simplified software interface for the TSB 400 may include just interfacing with the host CPU through the RDP API, while a more aggressive implementation would allow TSB 400 access to the underlying DirectX driver framework. The encoded DIB transfers and the special compressed video domain transfers are not part of a standard RDP implementation. Therefore these transfers may be piggybacked into an existing RDP transfer format, operate as some type of private RDP extension or operate outside of the RDP framework.

Some versions of the host operating system and RDP need to satisfy additional security requirements for the RDP protocol. The RDP client may be required to exchange a key with the host to make use of the encrypted packets. Since TSB 400 is intercepting the RDP client packets, the TSB 400 may include appropriate acceleration and offloading for key exchange and decryption for communicating with the host processor. In addition, in order to maintain the security of the system, the TSB 400 and network interface will assure that all communication with the RTs is appropriately encrypted.

In another embodiment, the TSB 400 may operate as a web server offload engine either as part of the web server or as an aggregation point for multiple web servers, and support browser and agent based RTs. Web server acceleration may be performed for JAVA, data encoding, data transcoding and other functions. In a further preferred embodiment, the RTs may run a more intelligent agent based browser which includes support for multiple protocols such as AJAX. Browsers using AJAX or a similar approach are able to maintain and manage information within the browser during user operations and only have to contact the web server when new information is needed. Instead of the server passing a complete frame, AJAX allows a more specific request of information to be performed and the web server provides just that new information which is then used with the previously stored information to locally generate a new frame. This persistence can be used for improving the user interface by prefetching information, by requiring smaller more efficient requests and by managing security. The requests generated by AJAX may be managed by the TSB 400 where security can be maintained and the data efficiently encoded by TSB 400 and the data decoded at the client side using AJAX and the functional blocks of RT 300.

A well designed AJAX web application will make use of the client's or proxy's ability to cache objects and lessen the need for sending complete frames where the TSB 400 may still be used for encoding the first request of any frame data. For web applications that are not designed for selective updates, the TSB 400 may be used as a proxy between such a web application and an AJAX based browser. Host 100 may not be the web server and may be a server located at an Internet Service Provider (ISP) or at a Point of Presence (POP). As a proxy, the host 100 or TSB 400 can coordinate with the RT 300 to perform selective updates based on the client driven requests. Even if the web application requires a complete frame update, the TSB 400 proxy can process and compare the new frame and old frame and provide the client with the encoded update information. This can allow a reduction in bandwidth and an improved user interface for the RT 300 even for web applications that are not specifically designed for selective updates.

TSB 400 can be implemented by a programmable solution that also solves the general offload tasks for several unrelated operations. Servers may benefit from offloading the network, storage, security and other tasks. An offload processor can be designed to statically or dynamically balance the various offload tasks and accelerate the overall system throughput for any given workload. For example, the server may be performing server based computing for thin clients during the day and running a large database operation at night. During the day the offload engine will run the operations described for the TSA. At night the offload engine will run iSCSI acceleration for accessing the large database from the disk storage system. The flexibility may be managed by an on-board or system wide management procedure that tracks the various workloads. The granularity for switching between offload tasks can be extremely small. The offload engine may be designed to perform very fast context switching so that within a single session it could perform the network, terminal services, storage, security and other offload tasks for the same session.

In order to support dynamic processing for the different offload tasks, TSB 400 uses processing blocks that are programmable and configurable and can be task switched and reconfigured quickly as the workload changes. Various memory blocks will be included in each of the processing blocks and a larger memory 434 may also be included. The CPU 402 is a generally programmable processor including its own cache memory and can perform the housekeeping and management for the offload as well as perform some of the higher level protocol and interface processing. Bridge Controller 404 may integrate network processors and manage the switch fabric interface 130 functions of TSB 400 and can manage multiple pipes of simultaneous communication. Special internal memory such as Content Address Memory (CAMs) as well as traditional memory may also be included within bridge controller 404.

Processing units of bridge controller 404 and TSA-GPU 700 may be implemented as Configurable Data Processors (CDPs) that are designed to be readily reconfigured to perform different processing at throughputs normally associated with dedicated hardware blocks. By utilizing CDPs instead of dedicated hardware, the different offload tasks can be performed by the same hardware. Prior art methods for designing CDPs such as reconfigurable data paths, dynamic instruction sets, Very Long Instruction Word (VLIW), Single Instruction Multiple Data (SIMD), Multiple Instruction Multiple Data (MIMD), Digital Signal Processing (DSP) and other forms of reconfigurable computing can be combined to perform very high performance computations. A CDP may also function as a security processor with or without additional dedicated hardware blocks for cryptography and key related functions.

For terminal services acceleration and proxy server operations, the CDPs may be configured to perform data encoding for tiles and rectangles, various forms of transcoding or transrating on video or data, generation and comparison for tile signatures and the other tasks described below with respect to the TSA-GPU 700. For storage acceleration, the CDPs may be configured for different aspects of iSCSI, Fiber Channel (FC), Fiber Channel Internet Protocol (FCIP) and Internet Protocol related tasks. Connections 490 may be configured to connect to FC or another storage protocol. For Internet content acceleration, a CDP may be configured to process XML traffic, SOAP, HTTP traffic, JVM and other traffic associated with Internet based communication. Other web server acceleration may include offloading DNS lookups and handling the TCP/IP connections as well as performing data encoding and transcoding for both traditional web clients as well as for AJAX-style agent based browsers.

The TSA-GPU 700 performs the graphics related offload and acceleration functions of the TSB 400. Multi-User Graphics Processor Unit (MU-GPU) 412 that includes support for selective display updates via Packets and may follow some or all of the proposed VESA Digital Packet Video Link (DPVL) standard though a preferred embodiment includes enhanced capabilities. The TSA 424 supports packet display updates from MU-GPU 412 either via system bus 406 or preferably supports input paths 414 and 416 which may be Serial Digital Video Output SDV01 and SDV02 or generalized ports having different bus widths, signaling protocols and frequencies. Examples include Digital Video Output (DVO), Digital Visual Interface (DVI), High Definition Multimedia Interface (HDMI), Display Port or other Low Voltage Differential Signaling (LVDS), Transition Minimized Differential Signaling (TMDS), PCI Express or another scheme. The display output paths may run at sufficient speed to output multiple frames of video at high refresh rates where frames may be selective update rectangles corresponding to more than one target RT. TSA 424 may be connected to local I/O or a network controller over a dedicated link 426, via the main system bus 4406 or more closely integrated via a System on Chip (SOC) implementation. A second system bus, 408 may also be included for additional bandwidth and to more directly support the bridge controller 404 and its interfacing to multiple switch fabrics.

In addition to performing traditional graphics processing, the MU-GPU 412 produces the display based selective updates which indicate which portions of the display have changed. The selective updates can take up the form of rectangles or tiles that are output either over video output path 414 or 416 or over the main system bus 406. The rectangle updates include a packet header to indicate the origin, size and format of the window. The origin can be used to indicate which RT is the destination. Tiles can also be used and may be standardized to one or more fixed sizes such that the header may need less information to describe the tile. Other information, such as if and how the rectangle or tile should be scaled at the RT, may also be included in the header. Other forms of selective updates include support for BitBlt, Area Fill and Pattern Fill where instead of sending a large block of data, a minimal amount of data is sent along with the command parameters for the operation to be performed at the RT. Other headers support updates in the forms of Video Stream, Genlock, scaled video stream, Gamma Table and Frame Buffer Control. Other enhanced and complex commands can also be put into the form of a selective update to an RT. The proposed DPVL specification details one possible implementation for the selective updates along with their headers.

One MU-GPU 412 may be effectively virtualized by the system for all of the RTs 300 by organizing RAM 418 into various display surfaces each containing display data for multiple RTs. The MU-GPU 412's 2D, 3D and video graphics processors (not shown) are preferably utilized to achieve high graphics and video performance. The graphics processing units may include 2D graphics, 3D graphics, video encoding, video decoding, scaling, video processing and other advanced pixel processing. The MU-GPU 412's display controllers may also perform functions such as blending and keying of video and graphics data, as well as overall screen refresh operations. In addition to the RAM 418 used for the primary and secondary display surfaces, there is sufficient off-screen memory to support various 3D and video operations. As an alternative to the DPVL method of managing selective updates, there may a Selective update buffer memory (S-Buffer) 404 within RAM 418. In one embodiment S-Buffer 404 stores status bits, a signature or both status bits and a signature which correspond to each tile for each virtual display. In another embodiment, S-Buffer 404 stores the tiles themselves, with or without header, status bit and signature information, where the tiles are arranged to be output for selective updates.

The graphics engines and the display controller will typically composite a complete display image that corresponds to the primary surface for each RT display. The RAM 418 will effectively contain an array of the display frames for all of the RTs. For example, for the display memory may be configured as a virtual display of 16K×16K pixels. In such an example application, 256 RT displays of 1K×1K can be mapped into the 16K×16K array. Similarly, if each RT were a cellular phone with a 256×128 display, 8192 virtual displays could be mapped into the 16K×16K display area. Additional off screen and scratch memory would also likely be included. Because this application involves multiple independent RTs, the MU-GPU 412 may add different security features to secure the different display areas and prevent one user from gaining access to another user's frame buffer. The system would preferably include hardware locks that prevent unauthorized access to protected portions of the display memory for both security and reliability concerns.

Figure 5:
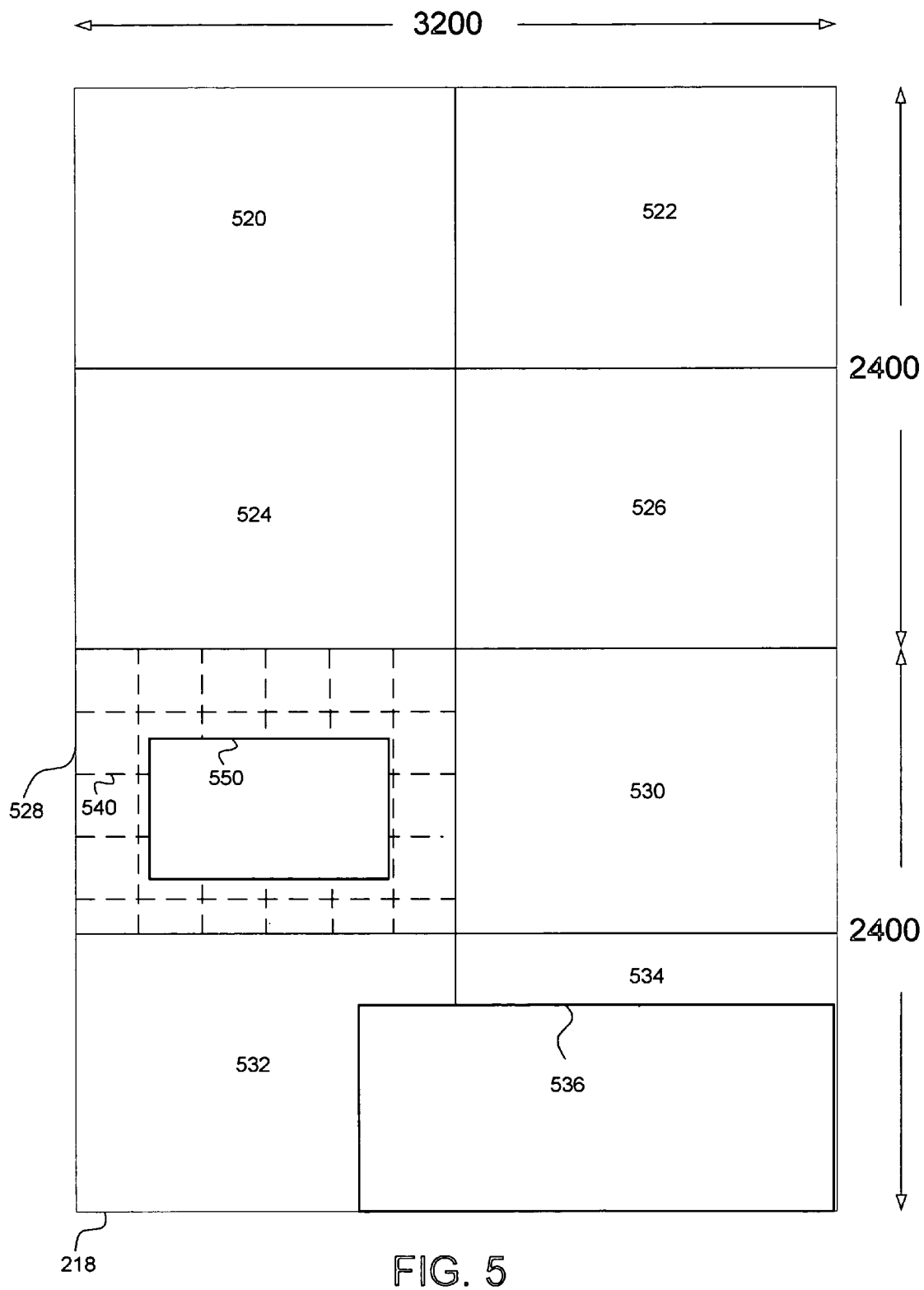
FIG. 5 represents a memory organized into eight display areas, one of which includes a display window and two of which are used to support one large RT display.

FIG. 5 shows an example configuration of FIG. 4 memory 418 where the virtual display space is set to 3200 pixels horizontally and 4800 pixels vertically. Memory 418 is divided into eight 1600×1200 display areas labeled 520, 522, 524, 526, 528, 530, 532 and 534. A typical high quality display mode would be configured for a bit depth of 24 bits per pixel, though often the configuration may utilize 32 bits per pixel as organized in RAM 418 for easier alignment and potential use of the extra eight bits for other purposes when the display is accessed by the graphics and video processors. The illustration of the tiled memory is conceptual in nature as a view from the MU-GPU 412. The actual RAM addressing will also relate to the memory page sizes and other considerations.

FIG. 5 in display area 528 further illustrates a display update rectangle 550. The dashed lines 540 of the 1600×1200 display correspond to even coarser block boundaries of 256 ×256 pixels referred to as precincts. As is apparent from display window 550 the alignment of the display window boundaries does not necessarily line up with the precinct boundaries. This is a typical situation as a user will arbitrarily size and position a window on a display screen. In order to support remote screen updates that do not require the entire frame to be updated, each of the precincts that are affected by the display window 550 needs to be updated. Furthermore, the data type within the display window 550 and the surrounding display pixels may be of completely different types and not correlated. As such, the precinct based encoding algorithm, if it is lossy, needs to assure that there are no visual artifacts associated with either the edges of the precincts or with the borders of the display window 550. The actual encoding process may occur on blocks that are smaller, such as 8×8 or 16×16, than the precincts. Therefore, a preferred embodiment uses a deterministic encoding algorithm, where the same result is produced for a set of pixels regardless of the surrounding pixels, and no artifacts will be produced by the arbitrary alignment of the window.

The block boundaries for the encoding scheme are also a consideration with respect to the tiles. For example, an encoding scheme may require block boundaries in multiples of 8 pixels. If the source tile is not a multiple of 8 pixels, it will need to be padded with the surrounding data. In another case, it is often preferred to orient the block boundaries to the screen, not to the particular user-placed rectangle or tile. If a user manipulates a window that is 80×80 pixels, even though it theoretically could have been placed to use a minimum of ten 8×8 blocks in each of the horizontal and vertical directions (one hundred blocks total), it is more likely to span eleven blocks in each direction (121 blocks). The rectangle update and any proceeding encoding of the rectangle will therefore encode 88×88 pixels (121 blocks) where some of the surrounding pixels are required for padding.

RTs with displays of different sizes can also be supported. In one example, the MU-GPU 412 can support an arbitrary number of arbitrarily sized-displays. In another example, it may be simpler to support smaller displays as sub-windows or a larger display as an overlay window spanning more than one display area. As delineated by rectangle 536, a 1920×1080 window would need to use both the 532 and 534 areas. While this wastes area, it may be simpler to implement than creating custom sizes for each display. Because of the selective rectangle update mechanism of MU-GPU 412, only the relevant areas of the screen will ever be transmitted. While DVPL dynamically controls the CRTC control registers to manage the selective updates, other more flexible mechanisms such as an S-Buffer can be implemented that require less processor intervention and improved system efficiency.

A more flexible system may also break the rectangles into more regular sized entities such as tiles. There is trade-off in the efficiency of header information with arbitrary rectangle sizes versus potentially simpler headers using less flexible tile sizes though more screen data. In one preferred embodiment, the tiles may be dynamically set to any multiple of the block size where the block size is the smallest entity for the data encoding algorithm. The blocks may be oriented either to the source image or to fixed block positions of the screen. The size of the tile would be included in the header information.

An area of memory, such as 530, may be designated as an S-Buffer 404 for managing the selective updates. In one embodiment, the S-Buffer includes status bits that correspond to the tiles of display frames 520, 522, 524 and 526 where the status bits indicate if a tile requires selective updating. The S-Buffer 404 may also store a signature for each of the tiles which is then used in determining the need for selective updates. In another embodiment, the tiles from frames 520, 522, 524 and 526 which require selective updates are copied to memory area 530 and queued for selective update output. The queued tiles may include various header, status and signature information.

Figures 6A, 6B:
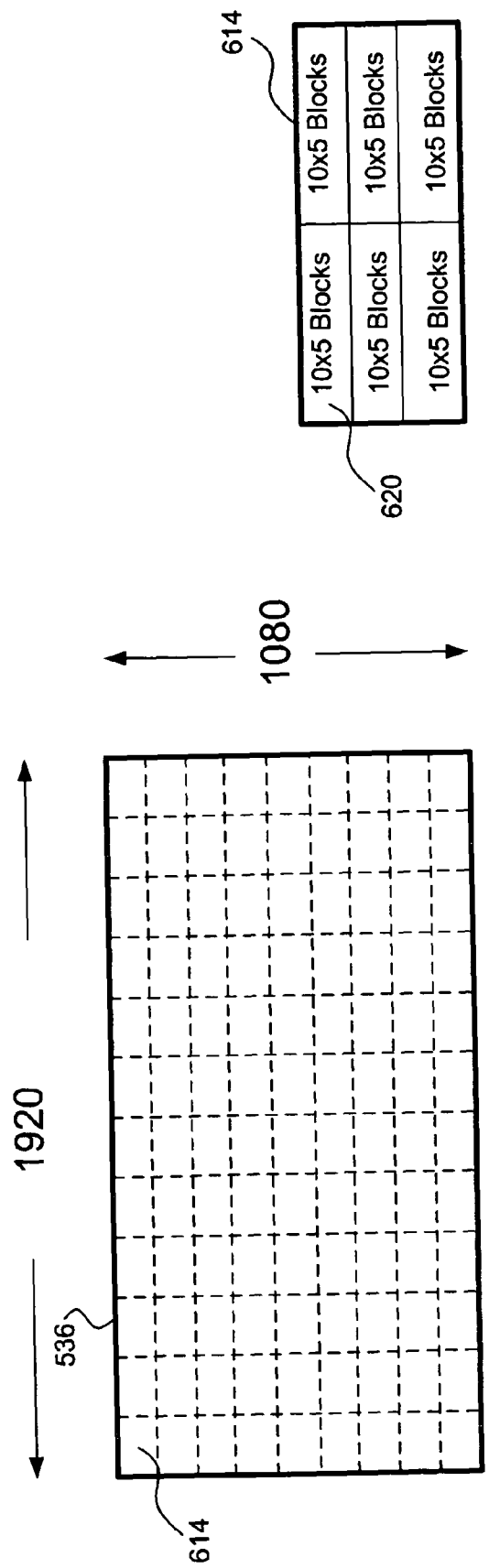
FIG. 6A shows a more detailed view of FIG. 5 display map 536.
FIG. 6B shows a FIG. 6A rectangle sub-divided into tiles.

FIG. 6A shows a more detailed view of FIG. 5 display map 536 which has a High Definition Television (HDTV) resolution of 1920×1080 referred to as 1080P. In FIG. 6A fixed size rectangles 614 are oriented with the screen position boundaries. Each rectangle is 160 pixels across and 120 pixels high. There are 12 rectangles per row (12×160 =1920) and 9 rectangles per column (9×120 =1080). A system may use these rectangles as the tiles that form the basis for selective updates. In FIG. 6B another system further divides the rectangles 614 into tiles 620 containing 80×40 pixels, and a system may choose these smaller tiles as the basis for selective updates. A more flexible system may utilize both the larger rectangles 614 made up of the six tiles 620 and the tiles themselves and use the header information to delineate which type is being output at any given time.

In both cases, the blocks that form the basis of an encoding algorithm fit within the tile or rectangle. Assuming 8×8 blocks, each tile has a 10×5 configuration of blocks and each rectangle has a 20×15 configuration of blocks. A system that utilizes both larger rectangles and smaller triangles may use different mechanisms for each in determining the selective update requirements. In one preferred embodiment, the large rectangles may have associated status bits indicating whether they have changed or not and the smaller tiles may utilize a signature for making such a determination. The status bits and signatures may be managed with S-Buffers as described below.

The MU-GPU 412 may integrate the processing to perform the selective encoding of the tiles directly, or each tile may be checked using the selective update process and output to the TSA 424 and will include an appropriate header. The header will be processed by the TSA 424 and, based on the fields within the header, the TSA 424 will know which RT and where on the display screen the tile is intended for. Where appropriate, the TSA 424 will encode the tile into a compressed format, adjust any required header information and provide the tile and header for further network processing.

The MU-GPU 412 and TSA 424 may partition the selective update process differently. In some cases the MU-GPU 412 can perform the complete management and will only send the tiles that need updating to the TSA 424. In other cases, the TSA 424 is required to perform further filtering of the slices to determine which slices truly require updates. Within the MU-GPU 412 the selective update mechanism can be hardwired or require CPU intervention and the hardware may be implemented across both the drawing engine and a selective update refresh engine. The encoding of the tiles may also be performed either in the MU-GPU 412 or in the TSA 424. The Mu-GPU 412 may also output the graphics drawing commands for the RT to the TSA 424 over the digital video bus, or the software drivers may provide the commands directly to the TSA 424.

For the selective tile updates, in a first embodiment, an S-Buffer is used where the MU-GPU 412 has a drawing engine that manages status bits for each tile and a selective update refresh engine that monitors the status bits as it manages the selective display updates for each tile. Like a Z-Buffer used in 3D graphics, the S-Buffer may be implemented as a separate memory plane of data. As with a Z-Buffer, the hardware drawing operations of an enhanced MU-GPU 412 can update the S-Buffer status bits without additional commands. The status bits are then used by selective update hardware to determine which of the tiles needs to be updated at the RT. Like the refresh cycle of a display controller, the selective update hardware may periodically traverse the S-Buffer and read the status bits. Based on the state of the status bits, the selective update hardware will either pass over a tile that does not need to be updated or it will read the tile for selective update, output the tile along with the header information and update the status bits accordingly. In a less efficient implementation, the MU-GPU 412 can use more traditional graphics drawing operations to generate an S-Buffer.

In another preferred embodiment not requiring specific S-Buffer hardware, the MU-GPU 412 can manage a selective update buffer of concatenated tiles that need updating. The selective update buffer may be constructed in a separate memory area. Every time that the MU-GPU 412 performs an operation that changes a tile, it will then copy that tile to the selective update buffer. The header information can be stored at the. start of each tile and the tiles can be packed together. The display controller is set up to use the selective update buffer and output it over the refresh port using a standard display controller output operation. The MU-GPU 412 can manage one or more buffers as a ring buffer or linked buffer list of concatenated tiles and provide a continuous output over the SDVO output that the TSA 424 treats as a tile list. Various schemes can be used for the MU-GPU 412 to arbitrate the priority for placement in the list. This method may be the most efficient for utilizing a MU-GPU 412 that has less specific hardware for supporting multiple RTs and has little or no special selective update hardware.

In another preferred embodiment, the TSA 424 operates in conjunction with the MU-GPU 412 to decide which tiles may require updating at the RT 300. The ability for the MU-GPU 412 to manage status bits on a per tile basis may be too difficult and may group the tiles into large tiles or the full virtual RT display and only have a limited granularity for the status bits. Reducing the large tiles into smaller tile updates can be performed based on tracking signatures for each tile. The signature is typically generated the first time that the tile is processed and checked against subsequent signatures. The signatures can be generated and processed by the TSA 424 operating from the incoming data or in conjunction with the selective update hardware of the MU-GPU 412. If the TSA 424 performs the signature checks for each tile, the network bandwidth to each RT 300 can be conserved. If the MU-GPU 412 performs the signature checks then the bandwidth over the video path to the TSA 424 will also be conserved. MU-GPU 412 can generate and manage a memory plane of signatures corresponding to the tiles where the status bits may be part of the signature plane or a separate plane. Alternatively, the status bits and signature bits may be managed in a RAM cache and managed with linked lists by MU-GPU 412.

Depending on the type of graphics command generated by the graphics operations on the host 400 and the capabilities of the RT 300, the command may be encapsulated and sent for execution at the RT or the command may be executed locally by the MU-GPU 412. In many cases, though the command is sent for execution at the RT, the command is also executed locally by the MU-GPU 412 in order to keep a local copy of the virtual display. Ideally, any tiles that changed as a result of the redundant local graphics command will be filtered out with the status bits to prevent unnecessary tile update packets being sent to the RT. It will typically require less bandwidth to send the command instead of an encoded tile, but it is not always possible. Systems that manually manage a selective update buffer would also consider the commands that are being sent to the RT. Tiles that will be updated by commands executed at the RT would ideally not be placed into the selective update buffer by the MU-GPU 412.

The virtual display memory of the proxy server or terminal services accelerator may be updated before the changes are reflected on the display of the RT. Although they correlate to the same display, the position of tiles and subframes as managed by the MU-GPU 412 and TSA 424 are positioned independently from the user interface operations. User interface operations may result in display changes within a tile or across multiple tiles. User interface changes may be initiated from a user operation, AJAX agent, browser or proxy server and result in an update to the virtual display memory. Updates in the tiles or updated subframes of the virtual display memory will be reflected at the RT and managed by the MU-GPU 412 and TSA 424.

In another example, a graphics command intended for an RT is processed by the TSA 424 and broken into an encoded data transfer and a modified graphics command. For example, the host system may wish to perform a BitBlt operation from off screen memory or from a pattern to on-screen memory. This could readily be performed at the MU-GPU 412 subsystem. However, at the RT the source data requested for the BitBlt is not cached. Therefore to be able to send the graphics command, it may first be necessary to encode, encapsulate and send the source data or pattern to the RT and then encapsulate and send a modified graphics command to the RT. This procedure can be offloaded by the TSA 424. While it is possible for the DirectX drivers to funnel commands through the MU-GPU 412 which then outputs them to the TSA 424, it is often more efficient for the DirectX driver to also communicate them directly to the TSA 424.

FIG. 7 shows a preferred embodiment which combines the Multi-User GPU (MU-GPU) 412 with the Terminal Services Accelerator (TSA) 424 into an Integrated Circuit (TSA-GPU-IC) System-On-Chip (SOC) 710. The combined TSA-GPU-IC 710 may include RAM 736 either on-chip or external as part of subsystem 700. The TSA-GPU 700 may include one or more system bus interfaces 406 and 408 that may be similar or different. The TAS-GPU 700 includes 2D Engine 720, 3D Graphics Processing Unit (GPU) 722, system bus interface 732 for various system buses like PCI express and control for local I/O 410 that can include interfaces for video or other local I/O. Additionally, the SOC 710 may include some combination of video compressor 724 and video decompressor 726 hardware, or some form of programmable video processor 764 that combines those and other video related functions. An additional processor 756 may also be included.

Also included are a multi-user Selective Update with display Controller (SUC) 750 that performs the selective updates, and a data encoder 752 that compresses the required subframes or tiles. The SUC 750 may include outputs 222 and 758 for local displays, though the remote multi-users are supported through the system interface 732 or potentially a direct connection 426 to the network controller. The system bus 760 is illustrative of the connections between the various processing units as well as the system interface 732 and memory interface 734. The system bus 760 may include various forms of crossbar switching, arbitrated transfers and may also have direct paths from one unit to another for enhanced performance.

In the FIG. 4 multi-chip TSA-GPU 700, the MU-GPU 412 is connected via the SDVO paths 414 and 416 to the TSA 424, and the MU-GPU and TSA each have their own RAM. Conversely, in FIG. 7 the TSA-GPU-IC 710 uses the shared RAM 736 instead of the SDVO paths. Using the RAM 736 eliminates the need to use the SDVO path for transfers and thus the SDVO bandwidth issue. Additionally, by sharing the memory, the SUC 750 is able to read the frame information directly from the memory thus eliminating the read of memory by the MU-GPU 412.

Several additional optimizations may be included in the SOC 710 of TSA-GPU 700 such as including S-Buffer support directly in each of the functional units. Also, instead of implementing the multi-user frame support with fixed size displays as illustrated in FIG. 5, TSA-GPU 700 may be designed to map support for multiple displays that are matched as far as resolution and color depth in their corresponding remote terminals. Matching the display in memory more directly with the corresponding remote display systems can achieve added efficiency for the memory use.

S-Buffer support may be used in hardware or in conjunction with a tracking software layer to assist in the encoding choice for display frames that have changed and require generation of a selective update stream. The S-Buffer support may utilize headers, status bits, signatures or a combination of the three and may be based on fixed size tiles or variable size tiles. The SUC 750 may utilize the S-Buffer support to determine what subframe of the display requires selective update. The header information may be useful for the downstream processing of the selective update.

Different systems may optimize for a reduced size of the header or for a reduced number of selective update transfers. For example, a preferred embodiment could utilize a tile based selective update system that includes a 64 bit header. Sixteen bits of the header may be used to designate which of 64K possible RTs is the intended recipient of the selective update. Another couple of bits could be used to indicate which of a limited number of the fixed sizes of tiles is included in the selective update. Another segment of bits would then designate which tile number that would indicate the location on the display that the selective update corresponds to. The selective update encoded data would then follow the header. Additional bits for designating priority, error checking and other tracking information could also be included.

In another preferred embodiment, the SUC 750 may not use tiles and requires a larger description for the selective update packet. For example, instead of providing a number to designate a tile position, a system may require an X and Y offset to designate a start position for a selective update rectangle. The selective update rectangle would then be described in the number of pixels or blocks for both the horizontal and vertical directions. Though the header information for such a system may be larger, the number of unique transfer to perform an update to a remote terminal may be less.

Depending on the capabilities of the RT and the network characteristics between the host 100 and the RT, the TSB 400 may opt to send some graphics commands directly to the RT instead of sending the selective updates. These graphics commands may be managed by the TSB CPU subsystem 402 or by processor 756. These processors may also manage the proxy server or other terminal services functions including performing command interpreting for both DirectX and RDP commands. As an interpreter, processor 756 or CPU subsystem 402 offloads the software drivers running on the host system to manage 2D graphics commands, 3D graphics commands, video streams and other windowing functions. The interpreter functions can be combined with data encoder 752 to perform many of the computationally intensive aspects of managing the RTs and can also optimize the commands, data and video streams to be sent from the host system to the various RTs. A proxy server may be split between the TSB 400 and the RT.

For example, various pattern BitBlts, sources to screen destination BitBits and other bitmap transfers can be enhanced. Graphics commands that require source data, source patterns or source bitmaps may encode the sources into a more efficient format via the data encoder 752. The encoded source data, source pattern or source bitmap is transferred along with a modified graphics command to the RT 300. The destination RT will receive the encoded source, decode it, and then, upon receiving the modified graphics command, perform the intended operation. The transfers for the encoded data and the modified command may either be with RDP transfers or with RDP-like transfers that are supported by the TSA-GPU 700 and the RT 300.

For a video stream in TSB 400, the DirectX interpreter software can intercept and offload the video stream processing and provide an optimal stream to the target RT. The first step in offloading is to make sure that the processor blade 200 is not performing the video decode on the multi-CPU complex 202. Host based decode has several downsides, the most significant two being, first, it takes a significant number of CPU cycles to perform the actual decode. Second, having decoded video frames at the host is not necessarily the best way to get frames displayed at the target RT. Instead, the DirectX interpreter software intercepts the DirectX call, which in some versions of Microsoft Windows® may entail using DirectShow, to gain access to the video stream while it is still in compressed form. The DirectX interpreter may need to fool the RDP software interface with a mock frame in order for the RDP to continue with normal operations.

Meanwhile, the TSB 400 is aware of what video stream formats the RT is capable of decoding, what the network throughput from the host system to the RT nominally is, and what resolution and display characteristics are intended with the video stream. With this information, the TSB 400 sets up the TSA-GPU to process the incoming video stream to produce the ideal stream for the network, RT and display output requirements. This may entail transcoding from one encoded format to another, transrating from one bitrate to another, changing the frame rate, changing the display format, changing the resolution or some combination of these. The TSB 400 then encapsulates the processed bitstream and sends it to the appropriate connection for network processing.

There are several ways for a proxy server or RDP server software running on system 100 to be partitioned between the processor blade 200 and the TSB 400. Two embodiments are considered here in detail, the first being the "terminate and regenerate" and the second being "offload and enhance." Variations on the embodiments are also possible that can utilize aspects of each embodiment.

In the case of "terminate and regenerate" an RDP client is run on the TSB 400. As far as the RDP server which is running on processor blade 200 is concerned, the RDP operations are terminated by TSB 400. In this case, the TSB 400 utilizes the TSA-GPU 700 to create a virtual display space to support multiple virtual RTs by creating a single large display map within which each user is offset or where each virtual display is seen as a separate display with its own mapping. The RDP client software may need to make use of key exchange and security processing between the processor blade 200 and the TSB 400 for RDP hosts that require secure client communications. As the RDP client receives commands from the RDP host, the client, utilizing TSA-GPU 700, renders the display frames into the display subsystem. With "terminate and regenerate," the TSB 400 is then able to use whatever means and whatever protocol it wants for communicating between TSB 400 and the RTs.

In a preferred embodiment of "terminate and regenerate" operation, the TSB 400 is configured as multiple RDP clients each corresponding to an RT. The processor blades 200 use the switch fabric to communicate with the "virtual" RDP clients. The TSB 400 then acts as a server to the RTs using Virtual Network Computing (VNC). All communication between the RTs and the host 100 is managed by TSB 400. VNC keyboard and mouse commands from the RT are translated by the TSB 400 into RDP commands to the processor blades 200. Any type of client that uses VNC is then able to effectively communicate with host 100 where the main processor blades 200 are running a non-VNC server. In a second preferred embodiment of "terminate and regenerate" operation, the TSB 400 acts as an Internet server and communicates to RTs running browsers. Since different browsers on different platforms may have different capabilities, TSB 400 may support different HTTP, XML, Java and other metadata protocols for communicating with the browser based clients.

For web services, the "terminate and regenerate" function is performed by a proxy server operating on TSB 400. The processor blade 200 may run a web server or may manage connections to a web server located elsewhere. Alternatively, TSB 400 may communicate directly with a web server. As a proxy server, TSB 400 will terminate all of the web operations. TSB 400 may include an agent, such as an AJAX agent that continuously makes requests to an upstream web server.

The TSB 400 then communicates directly with an RT client. TSB 400 may use any protocol that the RT supports and may choose to make the RT communication a completely separate protocol or may choose to reuse a similar web based protocol.

For the second embodiment of server based computing, "offload and enhance" maintains more of the processor blade 200's participation in client communication. The tracking software layer on processor blade 200 still redirects the DirectX video, graphics and data streams to the TSB 400 which completes the function of the DirectX call. Offloading the function makes the multi-CPU complex 202 available for other users of the multi-user system. The further processing can be completed by TSB 400 with an understanding of the display environment and the networking bandwidth which allows optimal processing.

The interpreter software on TSB 400 can also be used to manage the S-buffer with TSA-GPU 700 when a graphics command is performed both locally and forwarded to the RT for execution. The reason for the TSA-GPU 700 to execute the graphics command locally is so that a current copy of the frame buffer can be managed for future use. Since the graphics command is being executed at the RT, the tiles that change on the host as a result of the local graphics command do not need to have the selective update hardware send encoded tiles. To prevent this, the RDP tracking software needs to calculate which tiles are affected by the graphics command. The status bits in the S-Buffer that correspond to these tiles can be managed so that the tile based selective updates are not performed.

The tracking and interpreter software can also be used to assist in the encoding choice for display frames that have changed and require generation of a display update stream. Recall, that the encoding is performed to reduce the data required for the remote display system 300 to regenerate the display. The tracking software layer can help identify the type of data within a frame or tile so as to allow the most optimal type of encoding to be performed. Some RTs may not have sufficient graphics processing capability to execute the graphics commands and may be sent encoded data that is processed by the TSA-GPU 700.

For example, if the tracking software layer identifies that a surface of tiles is real time video, then an encoding scheme more effective for video, which has smooth spatial transitions and temporal locality, can be used for those tiles. If the tracking software layer identifies that a surface of tiles is mostly text, then an encoding scheme more effective for the sharp edges and the ample white space of text can be used. Identifying what type of data is in what region is a complicated problem. However, this embodiment of a tracking software layer allows an interface into the graphics driver architecture of the host display system and host operating system that assists in this identification. For example, in Microsoft Windows®, a surface that utilizes certain DirectShow commands is likely to be video data whereas a surface that uses color expanding bit block transfers (Bit Blits) normally associated with text, is likely to be text. Each operating system and graphics driver architecture will have its own characteristic indicators. Other implementations can perform multiple types of data encoding in parallel and then choose to use the encoding scheme that produces the best results based on encoder feedback.

This second embodiment of "offload and enhance" may also be utilized with a proxy server architecture for web based services. In such an embodiment, TSB 400 may communicate directly with the web server or may function as a split proxy coordinating communication between the RT and the web server. Agents running on the TSB 400 and RT may make continued requests to various web servers. TSB 400 may cache the web server information until such time as it is really needed by the RT for display. As described above, the TSB 400 may recode or reformat various graphics and video commands and data to better suit the communication channel to the RT as well as better match the functions and performance available within the RT. Various content management and content format operations may be performed by the TSB 400 operating as a proxy or split proxy server.

For the various data types, some types of encoding schemes are particularly more useful for specific types of data, and some encoding schemes are less data dependent. For example, RLE is very good for text and very poor for video, DCT based schemes are very good for video and very poor for text, and wavelet transform based schemes can be good for both video and text. Though any type of lossless or lossy encoding can be used in this system, wavelet transform encoding, which also can be of a lossless or lossy type, and in particular a progressive wavelet transform with a deterministic arithmetic coder that can encode each tile without concern for the surrounding tiles, is particularly well suited for this application. Derivatives of the JPEG2000 Wavelet encoder that tailor the processing for better real time execution are one possible implementation.

Figure 8:
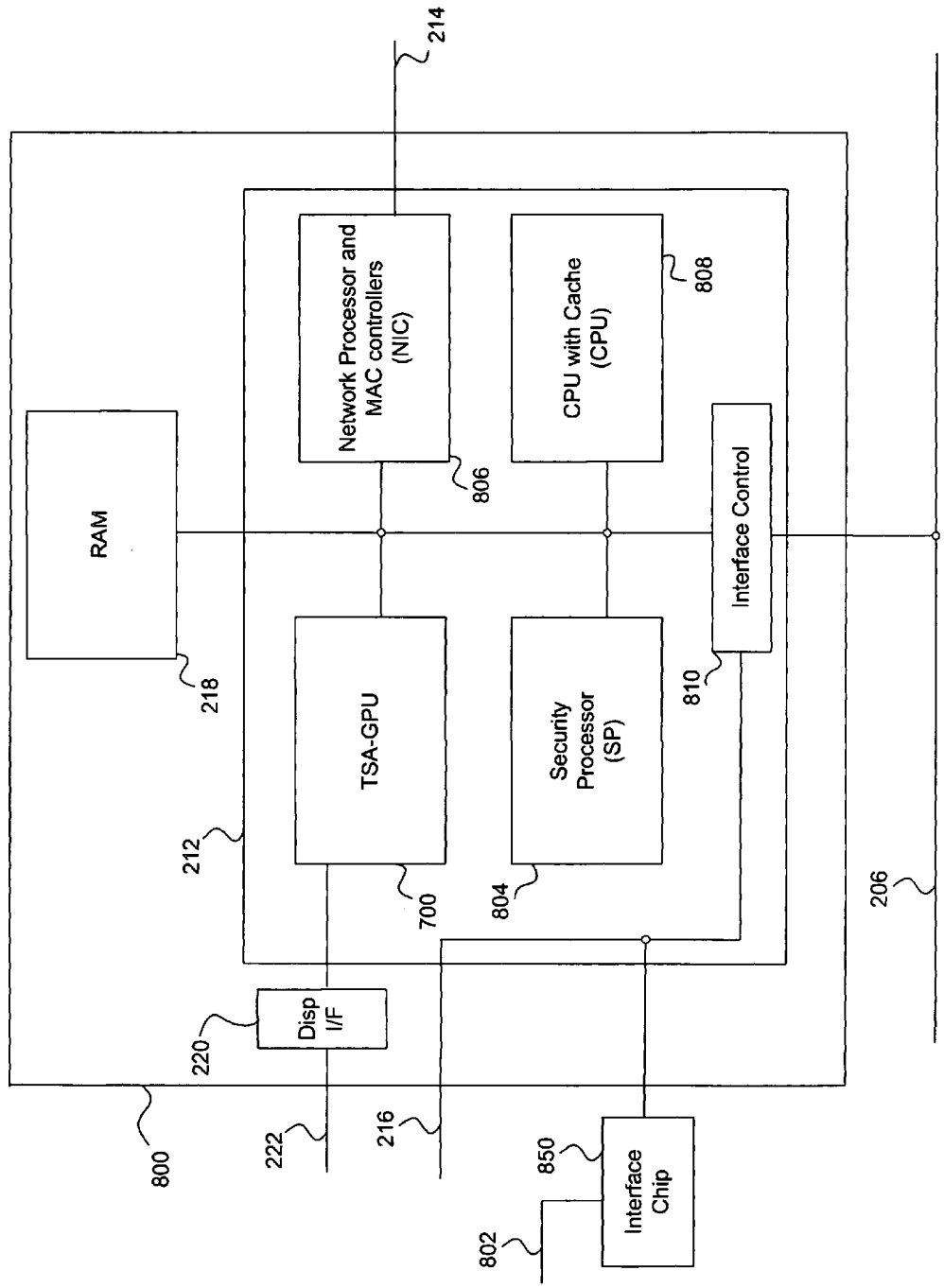
FIG. 8 is a block diagram of a Baseboard Management Controller with KVM which includes a graphics subsystem and other out of band processing.

FIG. 8 is a more detailed view of the BMC 800 from FIG. 2. The BMC 800 includes a CPU 808 that may be a simple microcontroller or may be a more powerful CPU with Cache. The BMC 800 also includes a Security Processor 804, Network Processor and MAC Controllers or "Network Interface Control" (NIC) 806, RAM 218, interface controls 810 and some form of a TSA-GPU 700.

The CPU 808 is an onboard processor that can operate "out of band" (OOB), which means that no dynamic software or intervention is required from the main CPUs. The ideal BMC 800 does not require any additional cabling and allows full remote administration of the processor blade 200. In some cases, the BMC 800 may be centralized to perform management for multiple blades. The BMC 800 shown here includes support for Keyboard, Video and Mouse (KVM) functions. In some systems, a CPU 808 may be further enhanced by a virtual machine running on the main system CPU. Though not completely OOB, a virtual machine may be designed to not interfere with the other system functions.

The communication with the BMC 800 may for security be encrypted using Security Processor 804 and may utilize a local network interface 214 or may transfer packets through bus 206 and over an appropriate FIG. 2 fabric connection 140 or 142. The network interface may be partially included as shown with NIC 806 which includes the MAC portion and the remaining physical interface (PHY) located elsewhere. Interface 814 may follow a standard such as Media Independent Interface (MII) or Reduced MII (RMI) when interfacing to an external PHY (not shown). The external Phy may be a dedicated device or part of another networking subsystem.

The display aspects for the BMC 800 can vary from simple to complex and can support one or more local or remote users. While a simple system could utilize a basic graphics controller and software to encode the display, the preferred embodiment utilizes a sophisticated combination of graphics acceleration, selective updates and encoding of the updates such that remote users have full performance virtual presence. As such, the BMC 800 shows the use of TSA-GPU 700 for the display support. Depending on the number of simultaneous users, the performance of the TSA-GPU 700 for this type of BMC 800 application may not need to be as high as in the TSB 400, though the capabilities may be similar.

In addition to supporting higher level virtual presence features for remote access, the onboard processor may interface to different sensors for various platform autonomics such as managing temperature, voltages, acoustics, sensors and LEDs. Mid level remote monitoring of alerts are also monitored and managed. To communicate with the external management system, the BMC 800 may include a web server and may comply with various industry efforts to standardize remote management such as Intelligent Platform Management Interface (IPMI) and Active Server Management Interface (ASMI). Support for simultaneous multiple users and virtual I/O devices, such as DVD drives, may also be included. Also shown in BMC 800 is interface control 810 which may interface directly to onboard sensors, to external interface chip 850 which communicate with onboard sensors over path 802 or to another local I/O controller via path 214. Instead of utilizing system bus 206 as shown in FIG. 8, the interface controls 810 may interface BMC 800 to another bus such as a system management bus.

Figure 9:
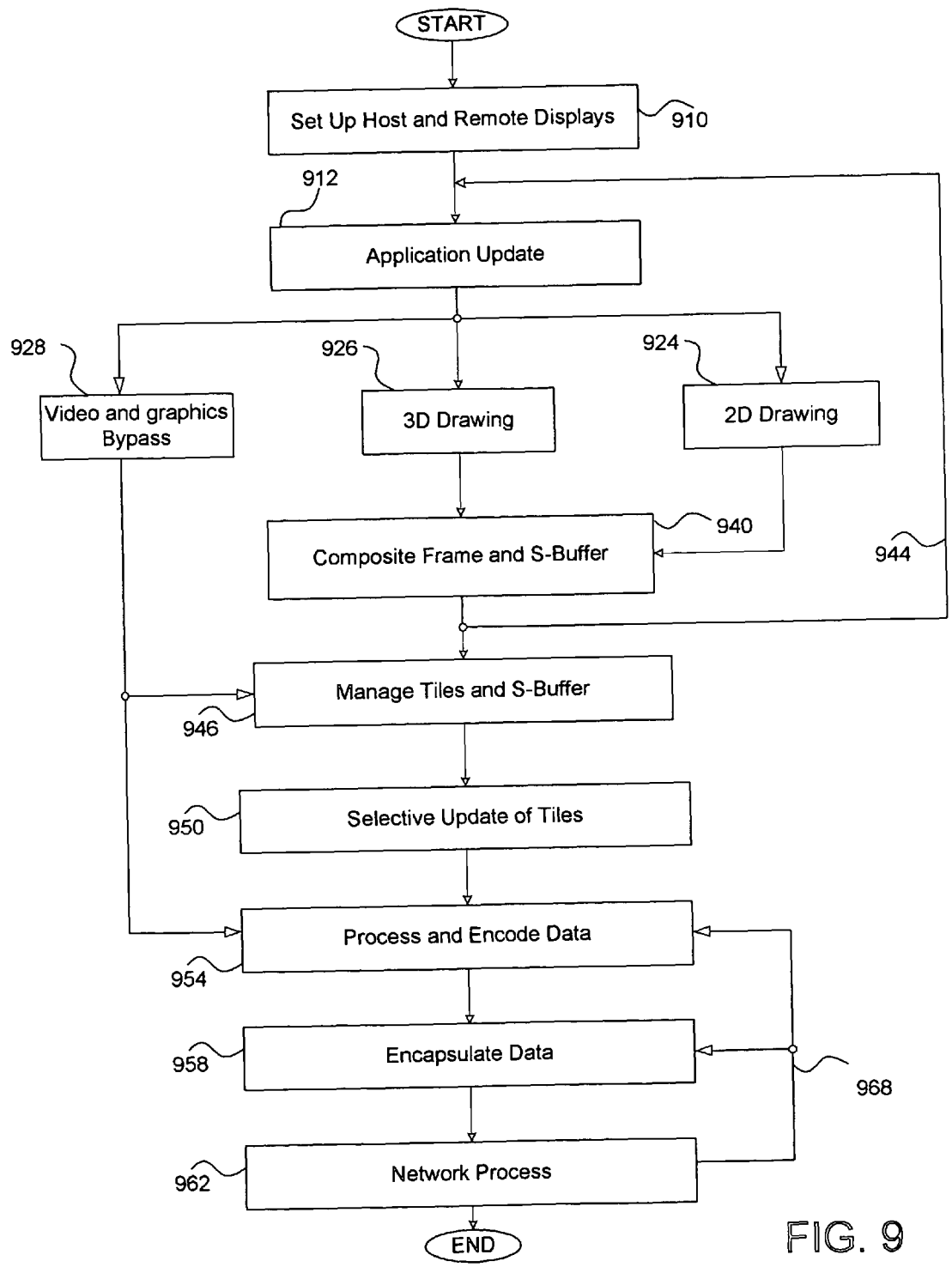
FIG. 9 is a flowchart of steps in a method for performing terminal services and display proxy server operations in accordance with one embodiment of the invention.

FIG. 9 is a flowchart of method steps for performing the terminal services acceleration and proxy server procedures in accordance with one embodiment of the invention. For the sake of clarity, the procedure is discussed in reference to display data including video. However, procedures relating to audio, keyboard, mouse and other data are equally contemplated for use in conjunction with the invention. Initially, in step 910, multi-user computer 100 and remote terminal system 300 follow the various procedures to initialize and set up the host side and terminal side for the various subsystems to enable each RT. In step 912, the application provides the updated display data in the form of a display command, display data update or video data stream. The application update may be initiated from the application itself, a user action at the client or some other agent at the application, proxy server or client. The application request may be intercepted by the tracking software layer running on the host CPU or commands may be intercepted by the proxy server or terminal services accelerator that is running on TSB 400. For BMC 800 in step 912, no tracking software layer is included and the BMC 800 operates independent of the host CPU.

If graphics operations include 2D drawing, then, in step 924, the 2D drawing engine MU-GPU 412 preferably processes the operations into the appropriate virtual display in RAM 430. Similarly, in step 926 3D drawing is performed to the appropriate virtual display in RAM by MU-GPU 412. In step 928, TSB 400 may determine that a video or graphics command will be forwarded to the appropriate RT. The flow through to step 940 may not be affected by bypass step 928. In step 940, the MU-GPU 412 composites each virtual display into a frame which is suitable for display. This compositing can be performed with any combination of operations by the CPU subsystem 202, 2D engine, 3D Engine and any video processing elements within GPU 412. As part of the compositing step, for MU-GPU 412 that includes S-Buffer management in the graphics processing hardware, the drawing engine updates the S-Buffer for the respective tiles.

As shown with return path 944, the TSB 400 may process the next frame for either the same RT or for a different RT as required. In one preferred embodiment, TSB 400 may run the complete client stack such that as far as the application server is concerned, the client has fully completed the drawing operation. Similarly, the TSB 400 may act as a proxy server or split proxy server to complete the web client operation with respect to the web server. The TSB 400 may run the client protocols to emulate multiple users. Once the TSB 400 has communicated to the server that the client side operation is complete, the TSB 400 may now use any mechanism to relay the intended command or display data to the target RT. As described earlier, the TSB 400 may resend the existing commands, reformulate modified commands or use a different mechanism to reflect the display updates to the RT.

As part of intercepting the commands, the TSB 400 may fully composite the intended RT display screen in local virtual display memory. Once the compositing operation is performed, step 946 manages the tiles and the associated S-Buffer status bits and signature bits where appropriate. Step 946 considers any graphics and video operations that were processed through the video and graphics bypass step 928 that may affect the S-Buffer status bits. For example, if a drawing operation was both performed both in step 924 and bypassed via step 928 to the remote terminal, there is no need to perform the selective update on the tiles affected by that drawing operation as the operation will occur at the RT.

With the status bits and signatures for the tiles processed in step 946, which may occur within MU-GPU 412 or in combination with TSA 424, step 950 can perform the selective update of the tiles. The tiles may be of fixed or variable size. The header information included with the tile will indicate the format as well as the intended RT destination. In step 954, the TSA 424 performs the necessary encoding of the tiles received from step 950. This encoding is preferably a deterministic scheme where the orientation of the data within the tile and the surrounding tiles need not be considered in the encoding step. Also in step 954, the video data and graphics commands that followed step 928 are processed. Video data may be transrated where the bit rate or frame rate is changed, scaled in either the frequency or spatial domain and transcoded to a different encoding standard where necessary. The network feedback via return path 968, along with the RT information, may both help determine the encoding step 954.

Step 954 also performs any graphics operations that require additional processing, which may entail encoding of graphics data. In step 958, TSA 424 or CPU 402 performs the further encapsulation of the graphics commands, data transfers or video transfers processed in the prior step. The network feedback is also considered in this step with respect to the network characteristics such as bandwidth and latency and particular packet sizes and transmission issues. In step 962, the encapsulated packet is processed via the appropriate network controller and the packet is transferred along the network to the appropriate RT 300.

The network process step 962 uses the information from the system control. This information can include information as to which remote display requires which frame update streams, what type of network transmission protocol is used for each frame update stream, and what the priority and retry characteristics are for each portion of each frame update stream. The network process step 962 may be managed local to the TSA utilizing local I/O 428 and local network connections 490. Alternatively, in a blade based system, the network ready packets may be transferred over one of the system fabric buses 140 or 142 for processing by either a processor blade 200 that includes a network connection or by a network processor located on another processor blade. The various networks may include Gigabit Ethernet, 10/100 Ethernet, Power Line Ethernet, Coaxial cable based Ethernet, phone line based Ethernet, or wireless Ethernet standards such as 802.11a, b, g, n, s and future derivatives. Other non-Ethernet connections are also possible and can include USB, 1394*a*, 1394*b*, 1394*c* or other wireless protocols such as Ultra Wide Band (UWB) or WiMAX.

Figure 10:
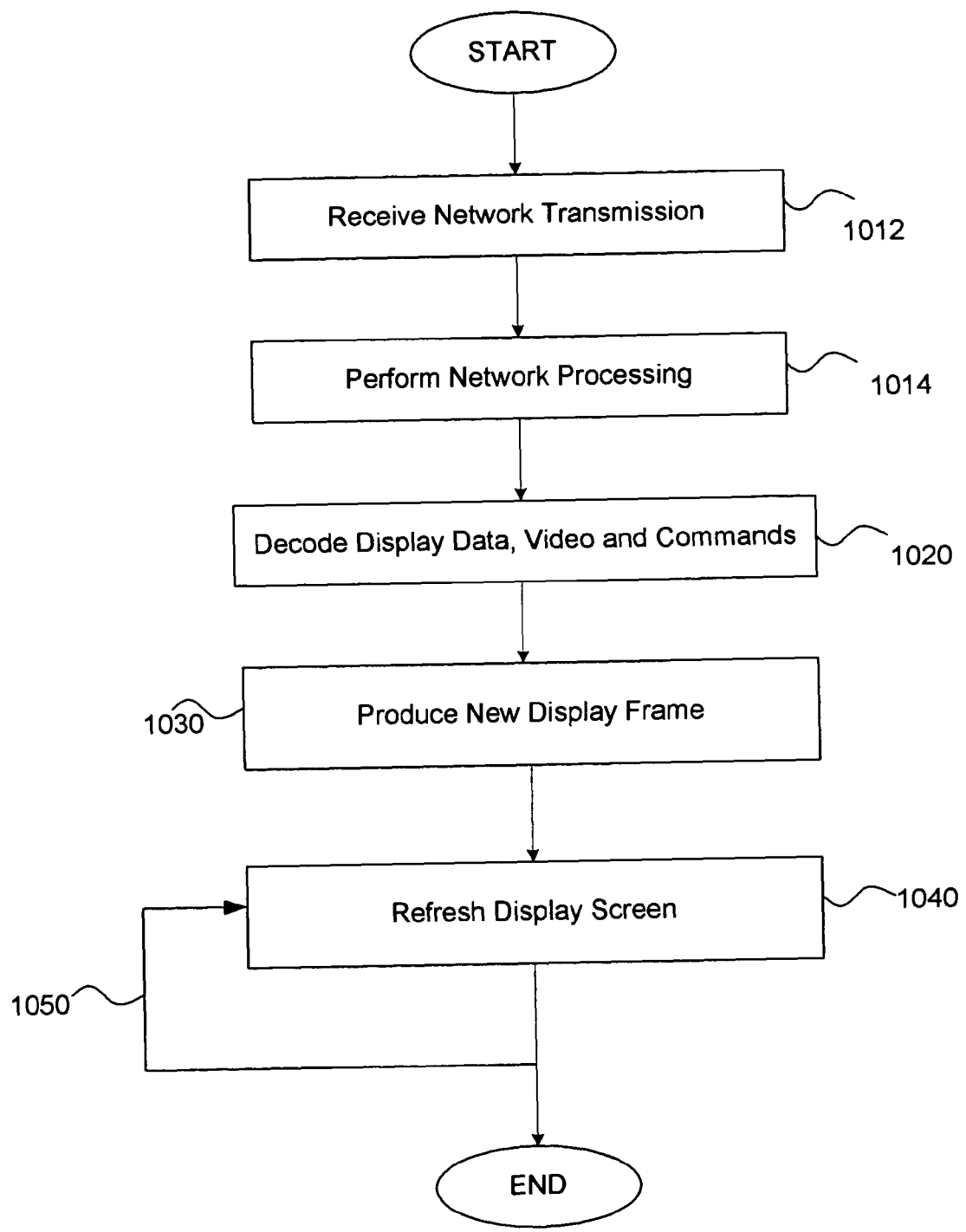
FIG. 10 is a flowchart of steps in a method for performing a network reception and display procedure for a remote terminal, in accordance with one embodiment of the invention.

FIG. 10 is a flowchart of steps in a method for performing a network reception and display procedure in accordance with one embodiment of the invention. For reasons of clarity, the procedure is discussed in reference to display data including video. However, procedures relating to audio and other data are equally contemplated for use in conjunction with the present invention. RT 300 may be configured to run a simple control program to perform functional operations, may be an operating system based processor system running a driver or application, or may be a browser running on some type of client which may or may not include JAVA processing or more agents including advanced AJAX processing. Additionally, RT 300 may initiate requests based on user actions or agent operations that result in display updates.

In the FIG. 10 embodiment, initially, in step 1012, remote terminal 300 preferably receives a network transmission via path 390 from host computer 200. Then, in step 1014, network controller 336 preferably performs a network processing procedure to execute the network protocols to receive the transmitted data whether the transmission was wired or wireless.

In step 1020, CPU 324 interprets the incoming transmission to determine which functional unit the transmission is intended for. If the incoming transmission is a 2D graphics command, then CPU 324 will initialize an operation via 2D drawing engine 332; if a 3D command then 3D drawing engine 334; if a video data stream then video decoder 328; and if an encoded tile of data then data decoder 326. Some drawing commands may make use of both the drawing engine and the data decoder 326. In some cases, incoming transmission data may be stored for use when needed. Various forms of AJAX and agent processing may make speculative requests for data that may or may not eventually be needed.

A varied number of commands and data transfers may take place and the various functional units operate and preferably manipulate the data information into an appropriate displayable format. In step 1030, the manipulated data from each of the functional units is assembled via frame manager 330 and may produce an updated display frame into RAM 312. The updated display frame may include display frame data from prior frames, the manipulated and decoded new frame data, and any processing required for concealing display data errors that occurred during transmission of the new frame data.

Finally, in step 1040, display controller 330 provides the most recently completed display frame data to remote terminal display screen 310 for viewing by a user of the remote terminal system 300. Display refresh is an asynchronous operation typically operating at 60 to 72 times per second between remote terminal controller 314 and display 310 to avoid flicker. Producing new display frames in step 1030 will typically occur significantly less often though when necessary may occur at 30 frames per second or more. In the absence of either a screen saver or power down mode, the display processor will continue to update the remote display screen 310 with the most recently completed display frame, as indicated with feedback path 1050, in the process of display refresh.

The present invention therefore implements a multi-user server based computer system that supports remote terminals that users may effectively utilize in a wide variety of applications. For example, a business may deploy racks of computer systems in one location and provide users at remote locations with very simple and low cost remote terminal systems 300 on their desktops. Different remote locations may be supported over a LAN, WAN or through another connection. The RTs may be desktop personal computers or notebook personal computers or in another system may be specialty devices such as cell phones, personal digital assistants or combined with other consumer products such as a portable video player, game machine or remote control system. Users may flexibly utilize the host computer of a multi-user system 100 to achieve the same level of software compatibility and a similar level of performance that the host system could provide to a local user. Therefore, the present invention effectively implements a flexible multi-user system that utilizes various heterogeneous components to facilitate optimal system interoperability and functionality.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

I claim:

1. A display proxy server system configured to support multiple remote terminals, comprising:
   a graphics and display subsystem having a display memory which can store display frames for multiple terminals, the graphics and display subsystem being configured to:
      generate display frames corresponding to display frames at one or more remote terminals, the display frames comprising sub frames wherein a size for each sub frame is dynamically configurable during run-time by the display proxy server system as a multiple of a minimum pixel block size of an algorithm selected to encode the sub frames, the algorithm selected during runtime based on characteristic indicators of content within the sub frames;
      track modified sub frames of the display frames and perform selective updates from the display memory based on the tracking, the tracking comprising generating signatures corresponding to the modified sub frames, performing signature checks for the modified sub frames, updating status bits to indicate that a sub frame requires selective updating, determining a type of data contained in the modified sub frames, and selecting an encoding algorithm based on the type; and
      respond to commands and requests from virtual machines via a virtualization abstraction layer including graphics drivers corresponding to operating systems executing on the virtual machines;
   the display proxy server system being configured to:
      communicatively couple said display proxy server system to one or more host CPUs;
      communicate with one or more host CPUs running one or more virtual machines configured to request graphics operations, locally manage the multiple virtual machine graphics requests, utilize the virtual machine graphics requests to produce virtual displays for requesting virtual machines, and transmit encoded updates of said virtual displays over a network to corresponding ones of said remote terminals;
      communicate with said one or more host CPUs in one of:
         an operating system virtual machine mode to perform operating system functions of said graphics processing operations, and
         a protected management virtual machine mode which is isolated from said operating system virtual machine mode, said protected management virtual machine mode being configured to manage some of the update functions for the remote terminals; and
      manage the selective updates from the display memory so that only the selective updates will be transferred via a network subsystem to corresponding ones of said remote terminals.

2. The system of claim 1 wherein said remote terminals are configured to execute an Internet browser and request web updates via said display proxy server system which is configured to perform a proxy function to request and receive the web updates from a web server and translate said web updates into encoded partial frame updates and provide said encoded partial frame updates to the Internet browser.

3. The system of claim 1 wherein said remote terminals are configured to execute an Internet browser and perform content based frame requests to said display proxy server system and said display proxy server system is configured to composite, encode and supply partial frame updates based on what portions of the frame have changed using data already cached at said display proxy server system.

4. The system of claim 1 wherein said display proxy server system is implemented in a blade system and said communicatively couple is provided over a system backplane.

5. The system of claim 1 wherein said display proxy server system is implemented as an appliance and is attached by both a network connection and a display output path to a server system.

6. The system of claim 1 wherein said display proxy server system is configured to communicate with a host CPU running an application, respond to the application as if it were a client, and perform selective display updates to the remote terminal.

7. The system of claim 1 wherein said display proxy server system provides a DNS lookup function for said multiple remote terminals when performing web accesses.

8. A display management system configured to support one or more remote terminals, comprising:
   a graphics controller and display subsystem configured to:
      perform graphics processor operations in a display memory, at the request of a host CPU, to generate display frame data;
      track modified sub frames of display frames, perform selective updates based on the modified sub frames, generate signatures corresponding to the modified sub frames, perform signature checks for the modified sub frames, updating status bits to indicate that a sub frame requires selective updating, determining a type of data contained in the modified sub frames, and selecting an encoding algorithm based on the type, the size for the sub frames being dynamically configurable during run-time by the display management as a multiple of a minimum pixel block size of an algorithm selected to encode the sub frames, the algorithm selected during runtime based on characteristic indicators of content within the sub frames;
      encode said selective updates such that extraneous video artifacts due to alignment of a display window and surrounding pixels are substantially minimized; and
      manage the selective updates from said display memory so that only the selective updates will be transferred via a network subsystem to corresponding ones of said one or more remote terminals;
   the display management system being further configured to:

communicate with one or more host CPUs running one or more virtual machines each requesting graphics operations, locally manage the multiple virtual machine graphics requests and utilize the virtual machine graphics requests to produce virtual displays for requesting virtual machines, and transmit encoded updates of said virtual displays over a network to corresponding ones of said remote terminals; and communicate with said one or more host CPUs in one of:
- an operating system virtual machine mode to perform operating system functions of said graphics operations, and
- in a protected management virtual machine mode which is isolated from said operating system virtual machine mode, said protected management virtual machine mode being configured to manage some of the update functions for the remote terminals.

9. The display management system of claim 8 wherein said selective updates are based on subframes of fixed tile sizes.

10. The display management system of claim 8 wherein said display management system uses an S-Buffer to manage selective updates.

11. A blade based multi-user system configured to support multiple remote terminals, comprising:
one or more processor blades connected to a backplane;
one or more terminal services accelerator blades including a graphics and display subsystem having a display memory which can store display frames for multiple terminals, the graphics and display subsystem being configured to:
  generate display frames corresponding to display frames at a remote terminal, the display frames comprising sub frames, the size for the sub frames being dynamically configurable during run-time by the graphics and display subsystem as a multiple of a minimum pixel block size of an algorithm selected to encode the sub frames;
  track modified sub frames;
  perform selective updates from the display memory based on the tracking, wherein the tracking comprises generating signatures corresponding to the modified sub frames, performing signature checks for the modified sub frames, and updating status bits to indicate that a sub frame requires selective updating;
  identify a type of data contained in the modified sub frames and determine an encoding technique as a function of characteristic indicators for said type; and
  respond to commands and requests from one or more virtual machines using a virtualization abstraction layer including graphics drivers corresponding to operating systems executing on the one or more virtual machines; and
an offload subsystem configured to:
  to intercept graphics commands or video data prior to being processed by said one or more processor blades and prior to sending graphics commands or video data to the remote terminals such that the one or more processor blades do not process the graphics commands or video data; and
process said intercepted graphics commands or video data, said processing process performed as a function of network conditions, display characteristics, and video decoding capabilities at said multiple remote terminals, said comprising at least one of transcoding from one encoded format to another encoded format, transrating from one bit rate to another bit rate, changing a frame rate, changing a display format, and changing a resolution;
communicatively couple said processor blades to one or more terminal services accelerator blades;
the blade based multi-user system being configured to:
  manage the selective updates from the display memory so that only the selective updates will be transferred via a network subsystem to corresponding ones of said remote terminals; and
  communicate with one or more host CPUs running one or more virtual machines each requesting graphics operations, locally manage the multiple virtual machine graphics requests and utilize the virtual machine graphics requests to produce virtual displays for requesting virtual machines, and transmit encoded updates of said virtual displays over a network to corresponding ones of the remote terminals; and
  communicate with said one or more host CPUs in one of:
    an operating system virtual machine mode to perform operating system functions of said graphics operations, and
    in a protected management virtual machine mode which is isolated from said operating system virtual machine mode, said protected management virtual machine mode being configured to manage some of the update functions for the remote terminals.

12. The system of claim 11 wherein said one or more terminal services accelerator blade is configured to communicate with a host CPU which is running application software and which is configured to:
utilize a multi-user remote client protocol that virtualizes the graphics and display subsystem;
perform virtual graphics functions as the remote user client; and
perform the selective display updates from the virtual display subsystem to the remote terminal.

13. The system of claim 11 wherein said terminal services blade is configured to communicate with one or more CPUs running one or more virtual machines each of which requests graphics operations as if the terminal services blade included a respective graphics controller dedicated to each virtual machine.

14. The system of claim 11 wherein said terminal services blade utilizes said graphics and display subsystem to locally manage virtual machine graphics requests from multiple independent virtual machine mode CPUs to produce virtual displays for virtual machines and then transmits encoded updates of said virtual displays over a network to remote terminals, and said multiple independent virtual machine mode CPUs are not aware of each other.

15. The system of claim 11 wherein said processor blades operate as a web server.

16. The system of claim 11 wherein said blade based multi-user system provides an Internet services management functions to multiple remote terminals which access multiple web servers.

* * * * *

UNITED STATES PATENT AND TRADEMARK OFFICE
CERTIFICATE OF CORRECTION

| | |
|---|---|
| PATENT NO. | : 8,112,513 B2 |
| APPLICATION NO. | : 11/289983 |
| DATED | : February 7, 2012 |
| INVENTOR(S) | : Neal D. Margulis |

It is certified that error appears in the above-identified patent and that said Letters Patent is hereby corrected as shown below:

In column 31, line 62, in Claim 11, after "said" delete "processing".

In column 32, line 3, in Claim 11, after "said" insert -- process --.

Signed and Sealed this
Twenty-seventh Day of March, 2012

David J. Kappos
*Director of the United States Patent and Trademark Office*